United States Patent
Friese et al.

(10) Patent No.: US 9,902,634 B2
(45) Date of Patent: Feb. 27, 2018

(54) MODULES FOR USE IN AND OPERATION OF A MEMBRANE BIOFILM REACTOR WITH REDUCED BIOFOULING

(71) Applicant: APTwater, Inc., Long Beach, CA (US)

(72) Inventors: David D. Friese, Orinda, CA (US); Ryan S. Overstreet, Discovery Bay, CA (US)

(73) Assignee: McWong Environmental Technology, Sacramento, CA (US)

( * ) Notice: Subject to any disclaimer, the term of this patent is extended or adjusted under 35 U.S.C. 154(b) by 696 days.

(21) Appl. No.: 13/653,375

(22) Filed: Oct. 16, 2012

(65) Prior Publication Data
US 2013/0105391 A1   May 2, 2013

Related U.S. Application Data

(60) Provisional application No. 61/548,137, filed on Oct. 17, 2011.

(51) Int. Cl.
*C02F 3/10* (2006.01)
*C02F 3/28* (2006.01)
(Continued)

(52) U.S. Cl.
CPC ............ *C02F 3/102* (2013.01); *B01D 63/026* (2013.01); *C02F 3/2806* (2013.01); *C02F 3/34* (2013.01);
(Continued)

(58) Field of Classification Search
CPC .... C02F 1/74; C02F 3/00; C02F 3/102; C02F 3/2806; C02F 3/34; C02F 3/341; C02F 2101/12; C02F 2101/16; C02F 2101/163; C02F 2101/166; C02F 2101/30; C02F 2101/36; C02F 2103/365; C02F 2203/006; C02F 2301/026; C02F 2303/20; B01D 63/02; B01D 63/021; B01D 63/024;
(Continued)

(56) References Cited

U.S. PATENT DOCUMENTS

| 4,758,341 | A | * | 7/1988 | Banner .......................... 210/232 |
| 4,814,079 | A | * | 3/1989 | Schneider ................ 210/321.83 |

(Continued)

FOREIGN PATENT DOCUMENTS

| EP | 1270063 A | 1/2003 | |
| EP | 1270063 A2 * | 1/2003 | ............. B01D 63/02 |

(Continued)

OTHER PUBLICATIONS

International Search Report from PCT Patent Application No. PCT/US2009/051957 dated Nov. 4, 2009, Application published as International Publication No. WO 2010/014605 on Feb. 4, 2010.

(Continued)

*Primary Examiner* — Patrick J Orme
(74) *Attorney, Agent, or Firm* — Jacqueline F. Mahoney; Judy M. Mohr; McDermott Will & Emery LLP

(57) ABSTRACT

A module for use in a membrane biofilm reactor is described, and systems comprising such modules are described. The module comprises a fabric formed from a sheet of hollow-fiber membranes and a spacer material situated between adjacent membrane sheets, which are wound around a central core tube in the module.

26 Claims, 16 Drawing Sheets

(51) Int. Cl.
*C02F 3/34* (2006.01)
*B01D 63/02* (2006.01)
*C02F 101/12* (2006.01)
*C02F 101/16* (2006.01)
*C02F 101/30* (2006.01)
*C02F 101/36* (2006.01)
*B01D 63/10* (2006.01)

(52) U.S. Cl.
CPC .............. *C02F 3/341* (2013.01); *B01D 63/10* (2013.01); *B01D 2313/143* (2013.01); *C02F 2101/12* (2013.01); *C02F 2101/163* (2013.01); *C02F 2101/166* (2013.01); *C02F 2101/30* (2013.01); *C02F 2101/36* (2013.01); *C02F 2203/006* (2013.01); *C02F 2301/026* (2013.01); *C02F 2303/20* (2013.01); *Y02E 50/343* (2013.01); *Y02W 10/15* (2015.05); *Y02W 10/37* (2015.05)

(58) Field of Classification Search
CPC ...... B01D 63/026; B01D 63/04; B01D 63/10; B01D 53/22; B01D 53/228; B01D 53/85; B01D 2313/14; B01D 2313/143; B01D 2313/146; B01D 2321/185; B01D 19/0031; B01D 2319/04; B01D 39/16; B01D 69/08; Y10S 210/903
USPC ......... 210/615, 151, 321.79, 321.88, 500.23, 210/620, 631; 96/8, 10; 435/297.4
See application file for complete search history.

(56) References Cited

U.S. PATENT DOCUMENTS

| | | | |
|---|---|---|---|
| 6,387,262 B1 | 5/2002 | Rittmann et al. | |
| 6,702,941 B1* | 3/2004 | Haq et al. | 210/315 |
| 6,702,944 B2* | 3/2004 | Husain et al. | 210/636 |
| 7,118,672 B2 | 10/2006 | Husain et al. | |
| 7,169,295 B2 | 1/2007 | Husain et al. | |
| 7,175,763 B2 | 2/2007 | Husain et al. | |
| 7,294,259 B2 | 11/2007 | Cote et al. | |
| 7,300,571 B2 | 11/2007 | Cote et al. | |
| 7,303,676 B2 | 12/2007 | Husain et al. | |
| 7,303,677 B2 | 12/2007 | Cote et al. | |
| 7,311,831 B2* | 12/2007 | Bradford et al. | 210/321.85 |
| 7,618,537 B2 | 11/2009 | Bowman | |
| 7,638,049 B2 | 12/2009 | Sengupta et al. | |
| 7,648,633 B2 | 1/2010 | Chen et al. | |
| 7,686,868 B2* | 3/2010 | Rubas | 96/7 |
| 7,815,801 B2 | 10/2010 | Borg et al. | |
| 2002/0020666 A1* | 2/2002 | Cote et al. | 210/605 |
| 2002/0150756 A1* | 10/2002 | Tanaka et al. | 428/364 |
| 2004/0013819 A1* | 1/2004 | Hou et al. | 427/580 |
| 2004/0149655 A1 | 8/2004 | Petrucco et al. | |
| 2006/0260998 A1 | 11/2006 | Suzuki et al. | |
| 2008/0093299 A1 | 4/2008 | Mahendran et al. | |
| 2008/0156718 A1* | 7/2008 | Larsen | 210/321.75 |
| 2008/0164208 A1 | 7/2008 | Doyen et al. | |
| 2008/0190836 A1* | 8/2008 | Beppu et al. | 210/321.74 |
| 2009/0095675 A1 | 4/2009 | Runneboom et al. | |
| 2009/0139650 A1* | 6/2009 | Hardwicke et al. | 156/278 |
| 2009/0165576 A1* | 7/2009 | Shin | 73/863.23 |
| 2009/0314713 A1* | 12/2009 | Shelby et al. | 210/636 |
| 2010/0089827 A1 | 4/2010 | Bowman | |
| 2011/0011798 A1 | 1/2011 | Borg et al. | |
| 2011/0180474 A1 | 7/2011 | Bowman | |
| 2011/0186508 A1 | 8/2011 | Bowman | |

FOREIGN PATENT DOCUMENTS

| | | |
|---|---|---|
| EP | 1859583 A | 11/2007 |
| EP | 2152394 B1 | 3/2011 |
| RU | 2007/103873 A | 9/2008 |
| WO | WO 2008/141935 A1 | 11/2008 |
| WO | WO 2009/035699 A | 3/2009 |
| WO | WO 2009/134377 A2 | 11/2009 |

OTHER PUBLICATIONS

International Search Report from related PCT Patent Application No. PCT/US2012/060465 dated Jan. 17, 2013.

Piret et al., "Model of oxygen transport limitations in hollow fiber bioreactors", Biotechnology and Bioengineering, vol. 37 pp. 80-92 (1991).

\* cited by examiner

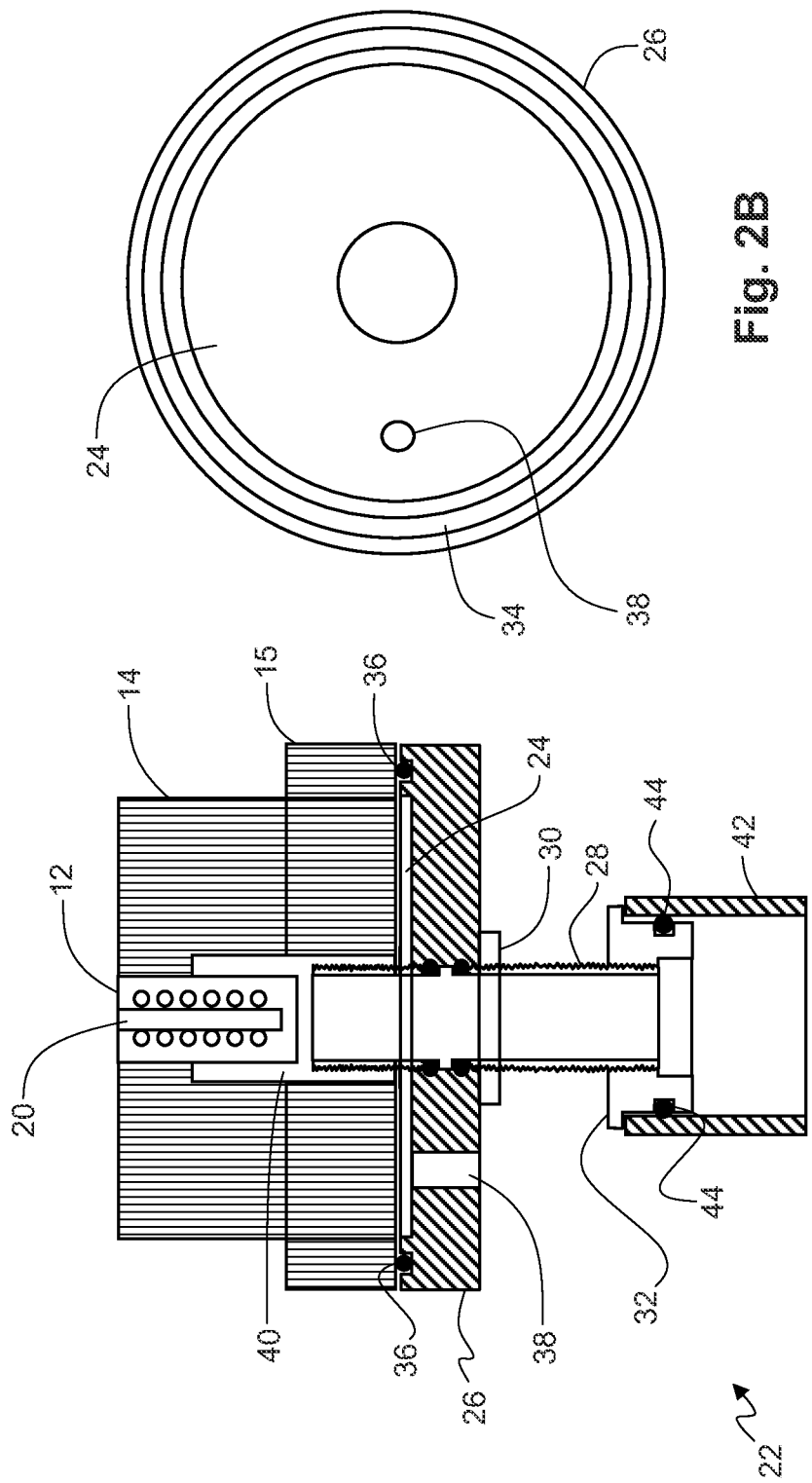

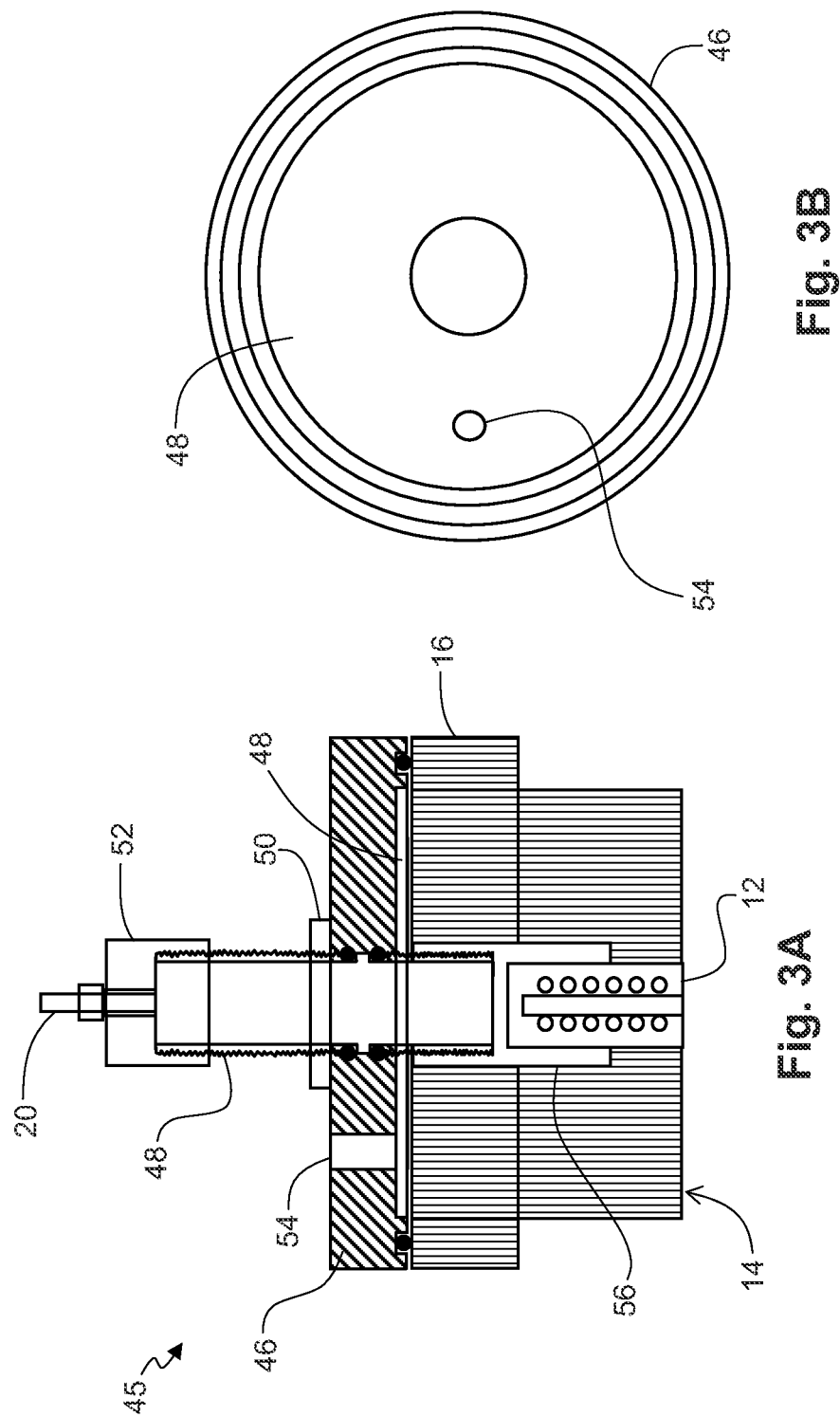

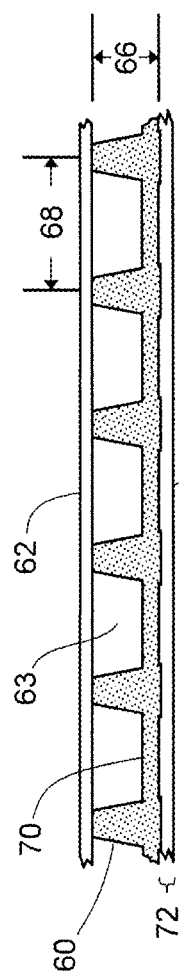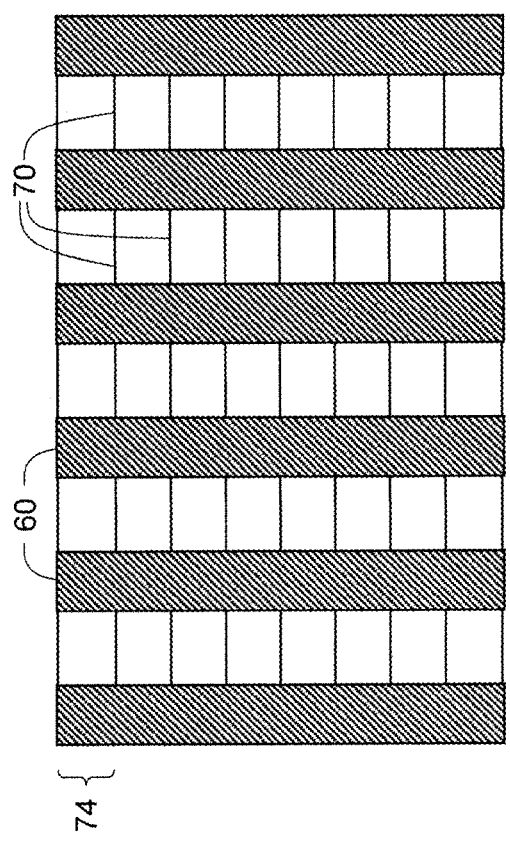

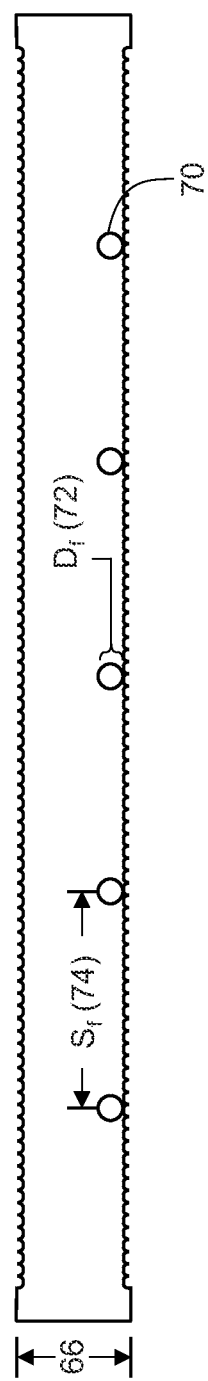

Multiple MBfR Module Tank Reactor

MODULES FOR USE IN AND OPERATION OF A MEMBRANE BIOFILM REACTOR WITH REDUCED BIOFOULING

CROSS REFERENCE TO RELATED APPLICATIONS

This application claims the benefit of U.S. Provisional Application No. 61/548,137, filed Oct. 17, 2011, which is incorporated by reference herein.

TECHNICAL FIELD

The present device, system, and method relate to the design and operation of membrane biofilm reactors for use in water treatment, and in particular to reduction of biofouling in membrane biofilm reactors.

BACKGROUND

The membrane biofilm reactor (MBfR) has been described for use in the decontamination of wastewater streams. In a typical MBfR device, as described, for example, by Rittman in U.S. Pat. No. 6,387,262, a matrix of hollow-fiber membranes provides a growth surface for a biofilm of microorganisms capable of metabolizing contaminants in an influent stream. For example, for reductive elimination of high oxidation state contaminants, such as nitrate or perchlorate, hydrogen gas, typically under pressure, is introduced into the lumen of hollow-fiber membranes, where it diffuses through the walls of the membrane to contact a biomass growing on the external surface (outside) of the membranes. Alternatively, an oxygen-containing gas, such as air, enriched air, or oxygen, may be introduced into the hollow fiber membranes to fee the biomass made of organisms able to remove oxidizable contaminants, such as ammonia or various organic compounds.

High packing density of the hollow-fiber membranes improves the efficiency of MBfR, in principle, by increasing the operable surface area of biofilm growth. However, high packing density can also lead to biofouling, which increases operating costs by reducing influent flow and requiring periodic maintenance to the MBfR (e.g. backwashing, disassembly, cleaning, etc.). Biofouling is evidenced by an increased pressure drop across the MBfR device, which is generally accompanied by an increase in the residual contaminant levels.

Thus, the need exists for MBfR devices and systems that maximize packing density while minimizing biofouling.

SUMMARY

In one aspect, the invention provides a membrane biofilm reactor module, comprised of a perforated core tube, having an interior which is in communication with a liquid influent port and a source of sparging gas, and a plurality of gas-permeable hollow fibers, each having an exterior surface, an interior surface that defines an inner lumen, a first open end, and a second open end which is in communication with a source of reagent gas. The hollow fibers are interwoven with warp fibers to form one or more hollow fiber membrane sheets, wrapped around said core tube to form adjacent facing layers, and a plurality of substantially parallel spacer elements are positioned between the adjacent facing layers of hollow fiber membrane sheets. The spacers are effective to maintain open flow channels between the adjacent facing layers. The parallel spacer elements are either (i) unconnected to each other throughout their central regions, comprising 95% or more of the length of the spacer elements; or they are (ii) connected to each other by transverse elements, where the average height of the transverse elements is less than that of the spacer elements, and is about 1 mm or less, and the average spacing between adjacent transverse elements is about 2.5 mm or more.

In a preferred embodiment, the hollow fiber membrane sheets and spacer elements support a flow of liquid influent that travels in a spiral flow pattern within the module.

In a selected embodiment, the parallel spacer elements are connected to each other by transverse elements. In this embodiment, the average height of the transverse elements may be about 0.75 mm or less, and the average spacing between adjacent transverse elements may be about 4 mm or more. The transverse elements may or may not contact the hollow fiber membrane sheets within the module.

In another embodiment, the parallel spacer elements are unconnected to each other throughout their central regions (where the central region is the region excluding the ends of a spacer; i.e. about 95%, or 99% or more, of the length of the spacer element). The spacer elements may be integral with the hollow fiber membrane sheets; e.g. attached to the hollow fiber membrane sheets or interwoven with the hollow fiber membrane sheets.

In one embodiment, the module comprises a plurality of hollow fiber membrane sheets, which are wrapped around the core tube such that the multiple hollow fiber membrane sheets at least partially overlap with one another. The number of sheets may thus be between 1 and about 200, or, in selected embodiments, more typically 1 to 100 or 2 to 100 or 3 to 100. In selected embodiments, the number of sheets is in the range of 1-50, 1-30, 1-20, 1-10, 2-50, 2-30, 2-20, 2-10, 5-20, 6-20, or 15-20.

Typically, the length of each hollow fiber fabric sheet is greater than the circumference of the core tube, such that said sheet is sufficiently long to wrap around the core tube at least once. Lengths are typically in the range of 6 in to 24 ft, more typically 1 to 12 ft, or 6 to 12 ft. In some embodiments, the length of each hollow fiber fabric sheet is less than the circumference of the core tube.

The hollow fiber membranes themselves comprise a polymeric material selected from the group consisting of poly (ethylene terephthalate) (PET), poly(trimethylene terephthalate) (PTT), poly(butylene terephthalate) (PBT), poly (ethylene naphthalate) (PEN), poly(cyclohexylene dimethylene terephthalate) (PCTA), polycarbonate (PC), poly(butylene naphthalate) (PBN), poly(lactic acid) (PLA), a halogenated polyolelin, and anon-halogenated polyolefin. Exemplary non-halogenated polyolefins include polypropylene (PP) and polymethylpentene (PMP).

Typically, the membrane biofilm reactor module further comprising a gas sparging port, in communication with the interior of the core tube, and a drain port, effective to drain material from the lumens of the hollow fibers.

In some embodiments, the module further comprises a retaining structure surrounding the hollow fiber membrane sheet(s). Preferably, the retaining structure is liquid permeable, such that the exterior surfaces of the hollow fibers are in fluid communication with a region external to the retaining structure.

In a related aspect, the invention provides a method for treating a liquid in a membrane biofilm reactor module as recited above, by introducing a reagent gas a single gas or a gas mixture), such as hydrogen or hydrogen/carbon dioxide, into the inner lumens of the hollow fibers, and introducing a liquid influent into the core tube of the modules.

The gas and/or liquid influent support the growth of a biomass on the external surfaces of the hollow fibers. Treated effluent liquid is collected at a liquid effluent port external to the module.

In another related aspect, the invention provides a system comprising a plurality of modules such as recited above, and a liquid-impermeable housing containing the modules. The housing comprises a plurality of liquid influent ports, one in communication with the respective influent port of each said module, and at least one liquid effluent port effective to discharge treated liquid. The hollow fibers of each module in the plurality are in fluid communication with the hollow fibers of every other module in the plurality.

Preferably, each module comprises a retaining structure surrounding the hollow fiber membrane sheet(s) within the module, and the retaining structure is liquid permeable, such that the exterior surfaces or the hollow fibers are in fluid communication with a region within the housing that is external to the retaining structures.

Preferably, the system further comprises one or more pumps and conduits effective to introduce a liquid influent into the core tube(s) of one or more of the plurality of modules, and to extract the liquid influent, preferably simultaneously, from the core tube(s) or one or more of the plurality of modules, and/or from within the retaining structures surrounding the hollow fiber membrane sheets, and/or from the region within the housing that is external to the retaining structures.

The system may be connected to an additional such system, via a forwarding line connecting the housings of the respective systems.

In the modules within the system(s), the parallel spacer elements positioned between adjacent facing layers of hollow fiber membrane sheets within the modules, as described above, may be connected to each other by transverse elements, or they may be unconnected to each other throughout their central regions, as described above. In one embodiment, the spacer elements are integral with the hollow fiber membrane sheets.

Preferably, the hollow fiber membrane sheets and parallel spacer elements are effective to support a flow of liquid influent in a spiral flow path about the central core tube within the module.

In a further related aspect, the invention provides a method for treating a liquid in a membrane biofilm reactor, the method comprises (a) providing a plurality of membrane biofilm reactor modules within a reactor housing, wherein said housing is liquid impermeable and comprises a plurality of liquid influent ports and at least one liquid effluent port. Each module comprises (i) perforated core tube, having an interior which is in communication with at least one of the influent ports and with a source of sparging gas, (ii) a plurality of gas-permeable hollow fibers, each having an exterior surface, an interior surface that defines an inner lumen, a first open end, and a second open end which is in communication with a source of reagent gas, such as hydrogen or hydrogen/carbon dioxide, wherein the hollow fibers are interwoven with fibers to form one or more hollow-fiber membrane sheets, wrapped around the core tube to form adjacent facing layers, and (iii) a plurality of substantially parallel spacer elements positioned between the adjacent facing layers of hollow fiber membrane sheets, effective to maintain open flow channels between said adjacent facing layers. The method includes (b) introducing the reagent gas into the inner lumens of the hollow fibers, and introducing a liquid influent into the core tube(s) of one or more of the plurality of modules, wherein the gas and/or liquid influent support the growth of a biomass on the external surfaces of the hollow fibers; and (c) collecting effluent liquid at the liquid effluent port of said housing.

As described above, the parallel spacer elements in (iii) are either unconnected to each other throughout their central regions comprising 95% or more of the length of the spacer elements, or are connected to each other by transverse elements, where the average height of the transverse elements is less than that of the spacer elements, and is about 1 mm or less, and the average spacing between adjacent transverse elements is about 2.5 mm or more.

As described above, the hollow fiber membrane sheet(s) and the spacer elements within each module preferably support a flow of liquid influent that defines a spiral flow pattern within the module.

The reagent gas may be selected from, for example, hydrogen, methane, oxygen, carbon dioxide, carbon monoxide, nitrogen, and combinations thereof. One such combination is hydrogen/carbon dioxide. A material such as a mineral acid or carbon dioxide may be introduced into the liquid influent ports to control the pH of the liquid.

During operation, material can be drained from the lumens of the hollow fibers through a drain port, either periodically or continuously.

The method preferably comprises a flow pattern in which liquid influent is introduced into the core tube(s) of one or more of the plurality of modules simultaneously with the extraction of liquid influent from the core tube(s) of another one or more of the plurality of modules.

In one embodiment, liquid extracted from the core tube(s) of any module is recirculated at least once through another one or more modules prior to exiting the reactor housing. Preferably, the influent liquid is introduced to and extracted from each module multiple times.

In one embodiment, as described above, each module comprises a retaining structure surrounding the one or more hollow fiber membrane sheets; preferably, each said retaining structure is liquid permeable, such that the exterior surfaces of the hollow fibers are in fluid communication with a region within the housing that is external to the retaining structures.

In a further embodiment, the method comprises a flow pattern in which liquid influent is introduced into the core tube(s) of one or more of the plurality of modules, simultaneously with the extraction of extracting liquid influent from the core tube(s) of one or more of the plurality of modules, and/or from within the retaining structures surrounding the hollow fiber membrane sheets, and/or from the region within the housing that is external to the retaining structures.

During operation, a sparge gas may be periodically introduced into the core tube of each module. In one embodiment, the flow rate of influent fluid is increased during introduction of the sparge gas.

Additional embodiments of the present device, system and methods, and the like, will be apparent from the following description, drawings, examples, and claims. As can be appreciated from the foregoing and following description, each and every feature described herein, and each and every combination of two or more of such features, is included within the scope of the present disclosure provided that the features included in such a combination are not mutually inconsistent. In addition, any feature or combination of features may be specifically excluded from any embodiment of the present invention. Additional aspects and advantages of the present invention are set forth in the

BRIEF DESCRIPTION OF THE DRAWINGS

FIGS. 2A-2B detail diagram of an exemplary bottom head component of the reactor module of FIG. 1 (FIG. 2A, cross sectional view and FIG. 2B, top view);

FIGS. 3A-3B detail diagram of an exemplary top head component of the reactor module of FIG. 1 (FIG. 3A, cross sectional view and FIG. 3B, top view);

FIGS. 6A and 6B illustrate a spacer material having transversal connector elements, in accordance with one embodiment of the invention (not necessarily drawn to scale), where FIG. 6A is a side view and FIG. 6B is a top view;

FIG. 7 is a cross-sectional diagram of a single channel formed by a spacer material having transversal connector elements, situated between facing portions of hollow-fiber membrane sheets, which was used as a modeling domain in the study of FIGS. 13-20;

DETAILED DESCRIPTION

I. Definitions

Prior to describing features of the present device and methods, the following terms are defined for clarity. Terms and abbreviations not defined should be accorded their ordinary meaning as used in the art.

As used herein, the terms "biofilm" and "biomass" refer collectively to organisms that grow on the exterior surface of hollow fibers in an MBfR. Such organisms typically affect removal of one or more contaminants present in influent liquid entering the MBfR. One skilled in the art will appreciate that a biofilm or biomass accumulates in an MBfR during operation, and that the present MBfR device supports the growth of, but does not include, a biofilm/biomass.

As used herein, the term "biofouling" refers to the process by which a biofilm/biomass clogs, blocks, or otherwise restricts fluid and/or gas flow in an MBfR.

As used herein, the terms "inerts" and "inert materials" refer collectively to debris and other material that accumulates in the lumen of the hollow fibers. Such debris and material includes but is not limited to particulate matter present in the gas introduced into the lumen of hollow fibers, liquid and solutes that diffuse into the lumen from the exterior surfaces of the hollow fibers, organisms that grow in the lumen of the hollow fibers, and dust.

As used herein, the term "warp fiber" refers broadly to inert fibers (i.e., fibers not required to support a biomass) that can be combined, preferably interwoven, with hollow fiber membranes to separate and maintain the spacing of the individual hollow fiber membranes or small groups of hollow fiber membranes (tows); e.g. in a hollow fiber membrane fabric sheet. The warp fibers may be uniformly spaced along the length of the hollow fibers, and may be under sufficient tension to limit the movement of the hollow fibers, which assists in maintaining spacing. Exemplary warp fibers are made from recyclable plastic.

As used herein, the "spacing between" two adjacent elements, such as spacer elements or transverse elements as described herein, is the shortest distance between the centers of two adjacent elements.

The "height" of a element, such as a spacer element or transverse element as described herein, is taken in the direction perpendicular to the membrane sheet surface(s) adjacent to the spacer or transverse element. (It does not include any gap that may exist between the element and the membrane sheet surface.)

A spacer element that is "integral with" a hollow-fiber membrane fabric sheet is physically attached to or incorporated with (e.g. by interweaving) the hollow-fiber membrane fabric sheet. In this circumstance, the sheet with attached or incorporated spacer elements may still be referred to as individual components, e.g. "sheets and spacers".

When two elements or locations are said to be in "fluid communication", this means that a fluid, such as influent water, is able to follow a path from one element or location to the other.

II. MBfR Module

Figure 1:
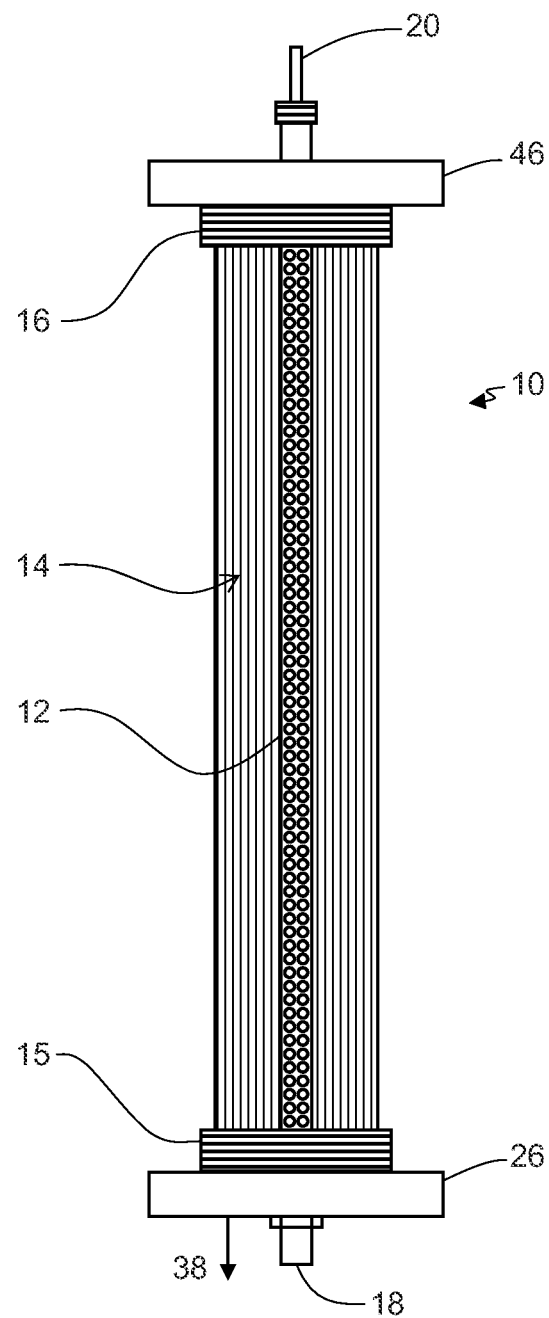
FIG. 1 is a diagram of an exemplary membrane biofilm reactor module, in accordance with one embodiment of the invention.

An exemplary MBfR module in accordance with the invention is illustrated in FIGS. 1-3. Many of the structural details shown are exemplary only and could be modified by one skilled in the art without departing from the inventive features of the module.

The MBfR module 10 (FIG. 1) includes a perforated core tube 12 surrounded by a hollow-fiber membrane sheet assembly 14, which comprises hollow-fiber membrane sheets and interleaf/spacer material, as described herein. Typically, in constructing the reactor module, the membrane sheets and interleaf/spacer materials are wrapped around the perforated core tube, and the ends of the sheets and spacers are potted with a resin. The potted ends are then machined to open the bore of the fibers, such that a gas may be introduced to the lumens of the fibers, and material may be drained from the lumens of the fibers. The opened ends of the potted fibers are referred to as "tube sheets" (15 and 16).

The core tube is open at one end to influent water (port 18). The reactor as shown also contains a gas sparge tube 20 which is in communication with the interior of the core tube 12. The gas sparge tube can be perforated along its length and sealed at one end, or non-perforated and open at each end. One end can also be equipped with a gas diffuser.

A bottom head 26 is designed to seal to the bottom tube sheet 15, and to allow materials, such as inerts, to be drained from the lumens of the membrane hollow fibers, via the inerts collection space 24 (FIGS. 2A-2B). The bottom head assembly, in the embodiment shown, also serves to introduce influent water into the core tube 12.

In the exemplary design shown, the bottom head assembly 22 (FIGS. 2A-2B; cross section and top view, respectively) includes ahead 26, a nipple 28, ahead nut 30, and a slip connector 32. The head is constructed of an inert material, such as fiber reinforced plastic, and includes a hole to allow the nipple 28 to pass through the head, a groove 34 to accommodate an O-ring 36, and a cavity (collection space 24) to collect material that drains from the lumens of the membrane hollow fibers. The cavity leads to a drain port 38, which itself leads to a conduit and valve, not shown in the figures.

A core tube coupling 40 is generally attached to the core tube 12 prior to potting the ends of the hollow fibers to form the tube sheet. This seals the core tube coupling into the tube sheet.

A header 42, for communication with a pump for introducing influent water, is attached to the nipple 28 via slip connector 32, which is constructed of an inert material such as polyvinyl chloride (PVC). An O-ring 44 provides a seal between the header and slip connector.

In the exemplary design shown, the top head assembly 45 (FIGS. 3A-3B; cross section and top view; respectively) is designed to seal to the top tube sheet 16 and core tube 12 and introduce a gas, such as hydrogen or hydrogen/$CO_2$, to the lumens of the hollow fibers, via distribution area 48. The exemplary top head assembly 45 includes head 46, nipple 48, head nut 50 and cap 52, all of which are constructed of inert material, typically fiber reinforced plastic (FRP) for the head and stainless steel for the other components. The head has a gas inlet 54 which is in communication with a cavity (gas distribution area 48) to distribute the gas or gas mixture to the lumens of the membrane hollow fibers.

A core tube coupling 56 is generally attached to the core tube prior to potting the ends of the hollow fibers to form the tube sheet. This seals the core tube coupling into the tube sheet 16. The top head assembly also accommodates sparge gas tube 20, which extends through the core tube and permits a sparging gas to be introduced into the core tube.

In operation, influent liquid, such as wastewater, enters the perforated center tube and flows through the perforations to contact the hollow-fiber membranes surrounding the tube, upon which a biomass is grown and maintained.

The module employs hollow-fiber membranes incorporated into fabric sheets, which are wrapped around the perforated core tube. This design allows a high packing density of hollow fibers. Typically, the individual hollow fibers have an outer diameter (OD) of 200 to 500 microns and are made from polyester, polypropylene or other polymeric material that can be used as a gas-transfer membrane.

Figure 10:
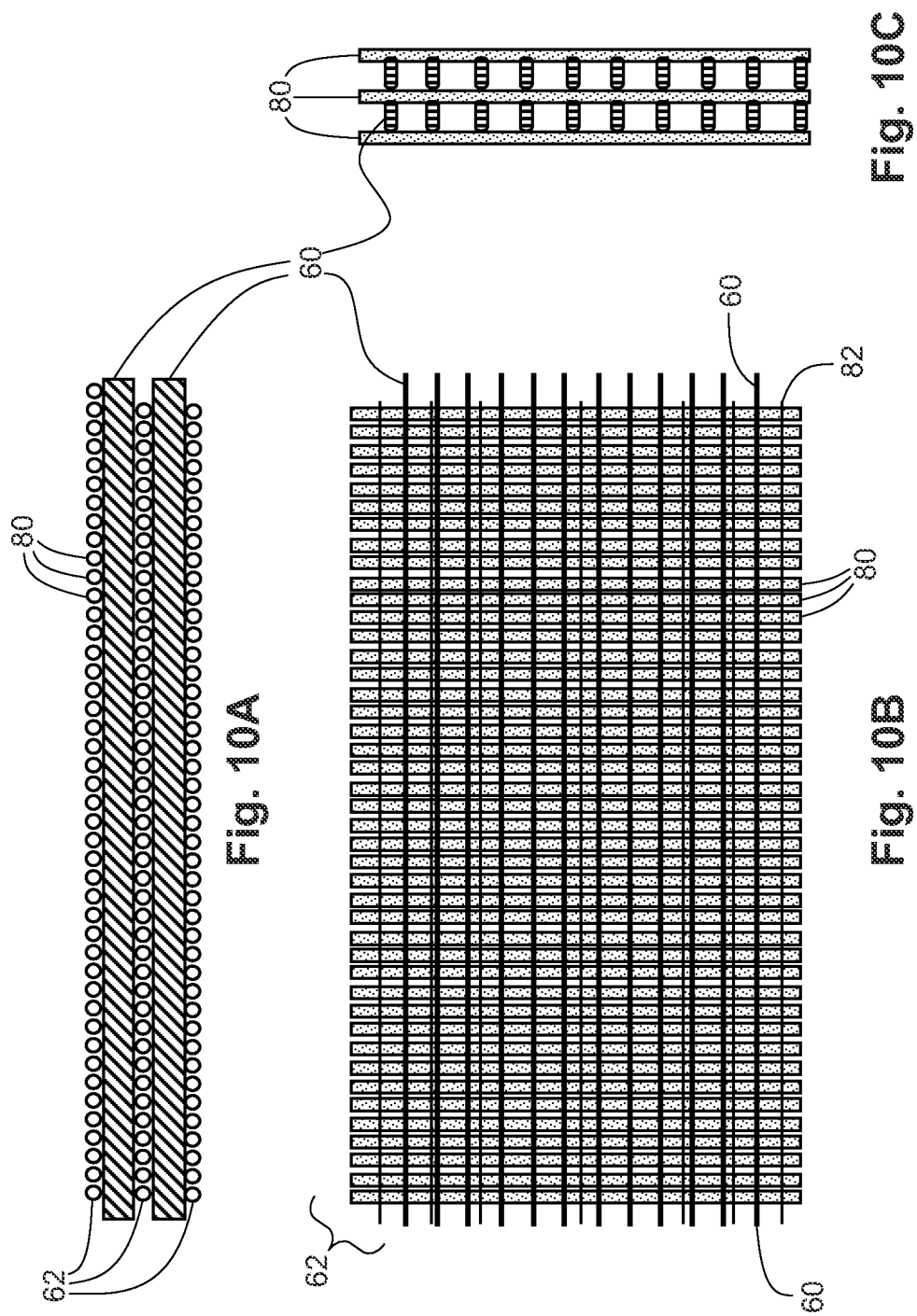
FIGS. 10A-10C show schematic end (FIG. 10A), front (FIG. 10B) and side (FIG. 10C) views, not necessarily drawn to scale, of a spacer material lacking transversal connector elements, in accordance with one embodiment of the invention, situated between facing portions of hollow-fiber membrane sheets.

To form a hollow-fiber membrane sheet or fabric, a plurality of hollow fibers are combined with one or more warp fibers, generally by interweaving, as illustrated, for example, in FIGS. 10A-10C (hollow fibers at 80 and warp fibers at 82). The hollow fibers may be arranged into bundles or tows and then combined with warp fibers; each bundle may include from 2 to about 200 hollow fibers, preferably 2 to 100 hollow fibers. The warp fibers are substantially inert and typically, but not necessarily, oriented perpendicular to the hollow fibers. The warp fibers preferably have some elasticity, to allow the hollow fibers to flex and expand, although the amount is not critical. The tension of the warp fibers is sufficient to maintain the position of the groups of hollow fibers, minimizing the deflections and movement of the hollow fibers under operating conditions; however, the hollow fibers may be able to flex and expand. The preferred composition and dimensions of the hollow fibers and warp fibers are described further below.

An interleaf or spacer material is used to separate adjacent facing hollow-fiber membrane sheets. The spacer may be a separate structure, or it may be integral with the hollow-fiber membrane sheet, as described further herein.

Figure 4:
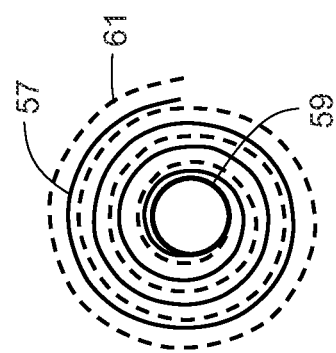

In one embodiment, as illustrated in FIG. 4, a single continuous hollow-fiber membrane fabric sheet 57 is wrapped around the perforated core tube of a reactor 59, with a corresponding interleaf or spacer structure 61 separating adjacent facing surfaces of the sheet.

Figure 5:
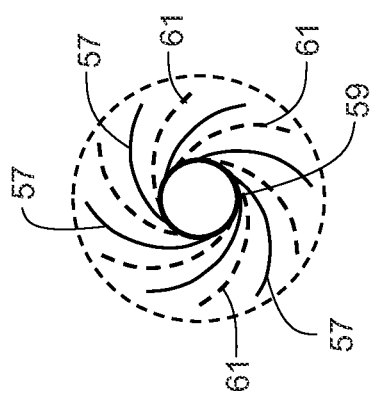
FIGS. 4 and 5 are schematic diagrams of a single-sheet hollow fiber membrane embodiment and a multiple-sheet hollow fiber membrane embodiment of a membrane biofilm reactor module, respectively.

In another embodiment, as illustrated in FIG. 5, multiple (or a plurality of) hollow-fiber membrane fabric sheets 57 are wrapped around the perforated core tube of a reactor 59. As shown in the figure, adjacent fabric sheets are separated by interleaf or spacer materials 61. Although the spacer materials are shown as separate from the membrane sheets in these Figs., they can also be attached to or interwoven with the membrane sheets.

The use of multiple hollow fiber membrane fabric sheets in the MBfR module is expected to reduce pressure drop by reducing the flow path of the treated water. Accordingly, the multiple-sheet module design represented in FIG. 5 includes a plurality of hollow-fiber membrane fabric sheets and a corresponding plurality of interleaf's or spacer materials, intervening between the hollow-fiber membrane fabric sheets, wrapped around the core tube to form alternating layers. A "plurality" intends two or more or three or more.

Generally, the width (defined as the direction parallel to the reactor core tube) of the hollow-fiber membrane fabric sheets is sufficient to extend into the potting resin (as described further below). The width of an interleaf material that is not an integral part of the fabric sheet (as described below) can be somewhat less than the width of the fabric sheet, such that it does not extend or extends only partially into the potting resin. The length (defined as the direction perpendicular to the reactor core tube, or the wrapping direction) of an individual sheet of interleaf material that is not an integral part of the fabric sheet (as described below) is generally the same or longer than the sheets of hollow-fiber membrane fabric, so as to provide a starting interleaf-only section at the core of the module and a final wrap of protective interleaf material on the outside of the constructed module.

The number and lengths (again, defined as the direction perpendicular to the reactor core tube, or the wrapping direction) of hollow-fiber membrane fabric sheets are dependent on the diameter of the final MBfR module, the amount of surface area desired, and the desired pressure drop. For example, the number of fabric sheets can vary from 1 to about 200 or more, more typically 1 to 100. In selected embodiments, the number of sheets is in the range of 1-50, 1-30, 1-20, 1-10, 2-50, 2-30, 2-20, 2-10, 5-20, or 15-20. Lengths of the sheets are typically in the range of 6 in to 24 ft, more typically 1 to 12 ft, or 6 to 12 ft.

III. Spacer Materials

As noted above, an interleaf or spacer material is used to separate adjacent facing hollow-fiber membrane sheets; the spacer may be a separate structure, or it may be integral with the hollow-fiber membrane sheet. The structure of the interleaf or spacer material has been shown to impact the pressure drop across the MBfR module, as well as efficiency of reaction (flux). See, for example, the discussion in the Experimental section below, with reference to FIGS. 7 and 13-20.

One form of interleaf/spacer material comprises a plurality of substantially parallel spacer elements positioned between adjacent facing layers of hollow fiber membrane sheets wrapped around the core tube of the module. With reference to FIGS. 6A (side view) and 6B (top view; neither necessarily drawn to scale), the spacer elements 60 are effective to maintain open flow channels 63 between adjacent facing layers 62, 64 of the hollow fiber membrane sheets. Thus, the predominant direction of influent flow between the sheets, and contacting the hollow fibers, is substantially parallel to the spacer elements (i.e. into or out of the plane of the page in FIG. 6A and vertically in FIG. 6B). The channels thus formed by the spacer elements between the hollow fiber membrane sheets provide a predominantly spiral flow pattern through the module, starting as the liquid exits the perforations in the core tube.

Typically, the spacer elements (i.e. the sheets containing them) are positioned within the module such that the spacer elements are roughly perpendicular to the length of the core tube, but they may also be positioned at an angle.

The height 66 of the spacer elements determines the distance maintained between adjacent facing layers of the hollow fiber sheets, and it is selected to optimize both structural stability and packing density. Spacer elements having heights in the range of about 1 to 3 mm, preferably about 2 mm, are typically effective. However, larger values, e.g. up to about 5 mm or more, may be useful in some instances.

The width of the spacer elements and the spacing between them (68) determine the size of the flow channels for the influent fluid, and are typically selected to provide maximum volume for influent flow while maintaining structural stability. Spacings of about 5 to 10 mm, preferably about 8-9 mm, are typically effective (where spacing is measured between the centers of the elements). However, larger or smaller values, e.g. from about 2 mm to about 15 mm or more, may be useful in some instances.

In exemplary systems, spacer elements having basal widths (i.e. the width of the element contacting the membrane sheet) of about 0.7 to 1.2 mm, e.g. about 1.0 mm, were effective. However, larger or smaller values, e.g. from about 0.5 to about 5 mm, may be useful in some instances. As noted below, the spacer elements may also vary in cross-sectional shape. Widths are preferably uniform from top to bottom or varying from top to bottom in a continuous manner (e.g. a straight line or regular curve).

Figure 9:
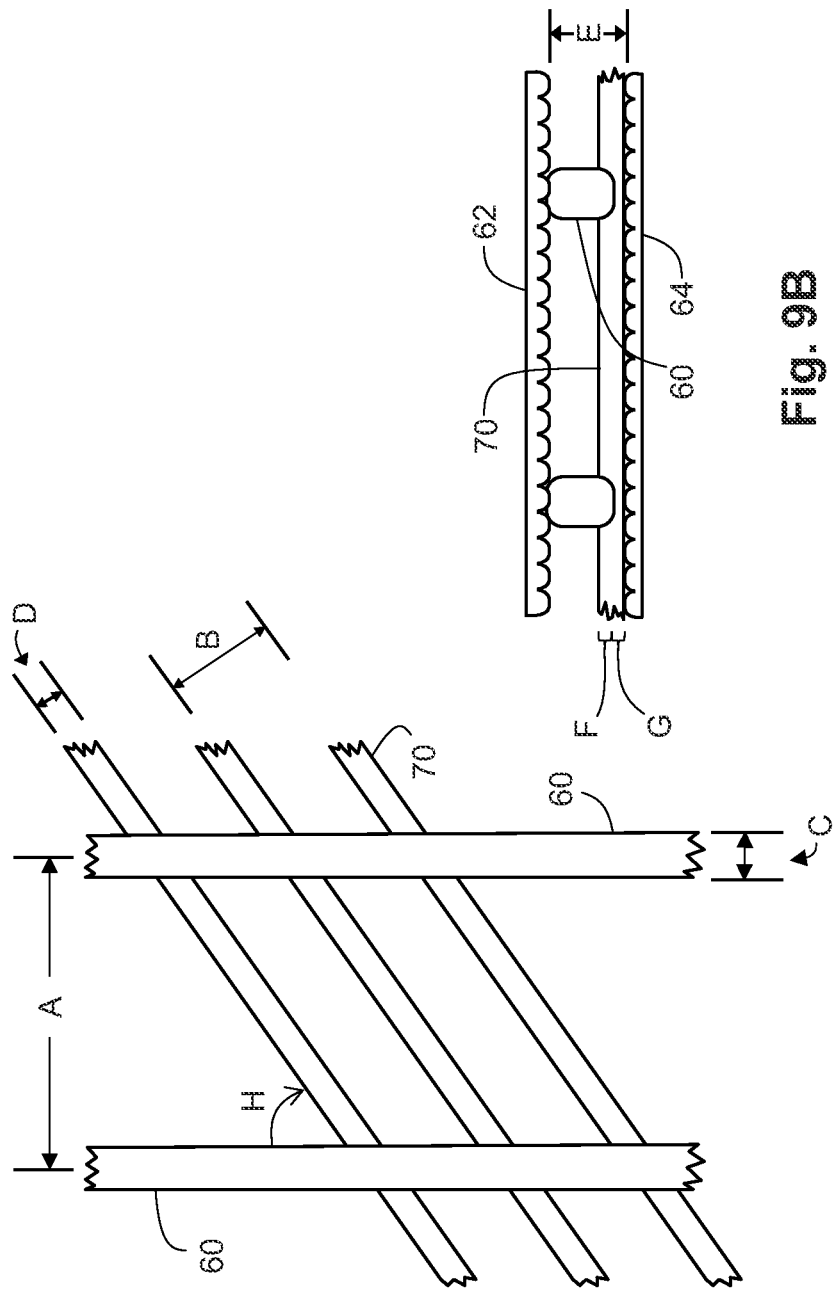
FIGS. 9A-9B illustrate another embodiment of a spacer material having transverse connector elements.

The spacer elements, in one embodiment, are connected to each other by transverse elements 70, to form a lattice-like structure, as shown, for example, in FIG. 6B. These transverse elements may be perpendicular to the spacer elements, as shown in FIG. 6B, or they may be at a non-right angles relative to the spacer elements, as shown in FIG. 9. The angle (H) between the spacer and transverse elements is thus preferably about 30-90°, more preferably 40-90°. In the case of a non-right angle, the angle may be e.g. 30-75°, 30-60°, or 40-50°.

The average height or diameter 72 (see e.g. FIGS. 6A, 7) of the transverse elements 70 is less than that of the spacer elements 60, preferably 75% or less of the height or diameter of the spacer elements, more preferably 50% or less. In some embodiments, the average height or diameter of the transverse elements is 40% or less, 30% or less, or 20% or less of that of the spacer elements.

Defined in absolute terms, the average height or diameter of the transverse elements is typically about 1 mm or less, and may be about 0.75 mm or less, about 0.65 mm or less, about 0.50 mm or less, about 0.45 mm or less, about 0.35 mm or less, or about 0.25 mm or less. The spacer elements are generally comprised of a stable polymeric material, such as a polyester or polyolefin, and the minimum height or diameter of the transverse elements will generally be limited by structural stability. It is expected that transverse elements, when used, would have a height or diameter greater than 0.1 mm for purposes of stability.

With respect to frequency, the average spacing 74 (sec e.g. FIGS. 6A, 7) between adjacent transverse elements is preferably about 2.5 mm or more. More preferably, the average spacing between adjacent transverse elements is about 2.5 mm or more, about 3.0 mm or more, about 4.0 mm or more, about 5.0 mm or more, or about 6.0 mm or more. Larger spacings are also contemplated, such as spacings of 7, 8, 9, 10, 15, 20 mm or more, where the upper limit is generally determined by the ability of the transverse elements to maintain adequate positional stability of the spacer elements. For purposes of stability, transverse elements will generally be present at least every 5 cm or less, except in cases where the spacer elements are integral with (i.e. attached to or interwoven with) the membrane sheets, as described below.

As used herein, with respect to the description above, the "spacing between" two adjacent elements, such as spacer elements or transverse elements, is the shortest distance between the centers of two adjacent elements (as shown at 68 in FIG. 6A). The "height" of a element, such as a spacer element or transverse element as described herein, is taken in the direction perpendicular to the plane of the membrane sheet (as shown at 66 and 72 in FIG. 6A).

Size and spacing of spacer elements and transverse elements determine the void volume of the spacer material, which is preferably at least 65%, more preferably at least 70%, and may be 75% or more.

FIG. 7 shows a cross-sectional view, looking in a direction perpendicular to the spacer elements and parallel to the transverse elements (shown in cross-section), of a portion of a single channel defined by two parallel spacer elements in a spacer material such as described above. The irregular lines at the top and bottom surfaces represent the facing hollow-fiber membrane sheet surfaces, and the circles represent the transverse elements in cross-section.

In one embodiment of a spacer such as that illustrated in FIGS. 6A-6B, the spacing 68 between spacer elements is about 8.5 mm, the spacing 74 between transverse elements is about 3.9 mm, the height 66 of the spacer elements is about 1.8 mm, and the height 72 of the transverse elements is about 0.45 mm. The spacer elements 60 are trapezoidal in shape, having a basal width of about 1.0 mm and a top width of about 0.7 mm. A three dimensional representation of such a spacer is shown in FIG. 7. The indicated dimensions are exemplary only, and variations by about 10% in either direction would be expected to provide a similarly performing structure.

Figure 8:
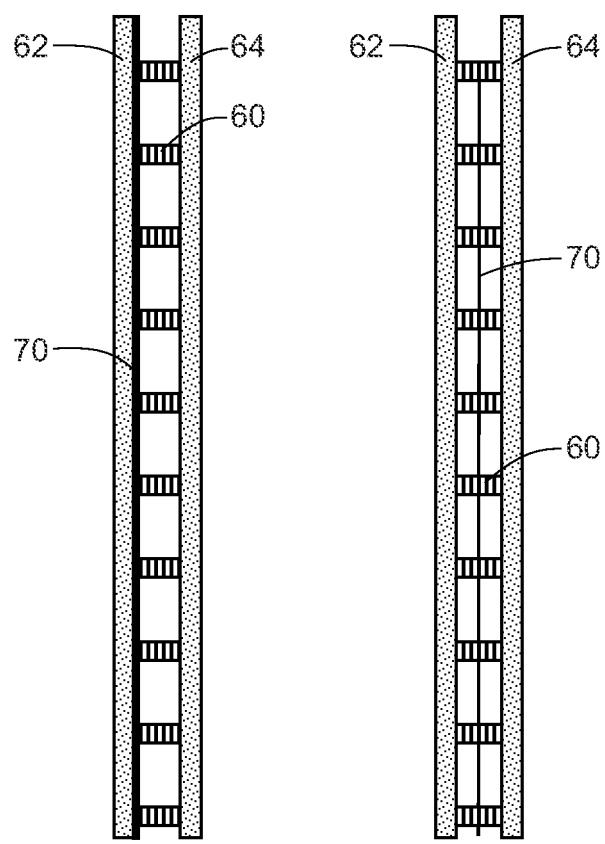
FIG. 8 is a schematic side view, not necessarily drawn to scale, of two embodiments of a spacer material having transversal connector elements, situated between lacing portions of hollow-fiber membrane sheets.

In general, the transverse elements 70 may connect the spacer elements at the bases of the spacer elements, as shown in FIGS. 6, 7, and 8 (left side), so that the transverse elements essentially rest on the membrane fabric sheet. Alternatively, the transverse elements may connect the spacer elements above the bases of the spacer elements, as shown in on the right side of FIG. 8, so that gaps are present between the transverse elements and the membrane fabric sheet. The gaps on either side of the transverse element may be approximately equal or they may be unequal.

Another embodiment of a spacer structure is shown in FIGS. 9A-9B (top view and side view, where the side view is looking down a channel formed by two spacer elements 60). In this structure, the transverse elements 70 are at a non-right angle (H) with respect to the spacer elements 60, as noted above. Only a few transverse elements are shown in FIG. 9A, for simplicity. In addition, the spacer elements 60 are only partially embedded in the transverse elements 70, such that, as shown in FIG. 9B, when the transverse elements 70 are contacting the adjacent membrane sheet 64, a small gap, such as represented by G, exists between the spacer elements 60 and the bottom membrane sheet 64. Such a gap would be behind the spacer element 70 that is shown at the front in the drawing. In the structure depicted in FIG. 6A, by contrast, the spacer elements 60 are fully embedded in the transverse elements 70, so that no such gap exists.

In an exemplary spacer structure in accordance with FIGS. 9A-9B, the spacing 68 (represented by A in FIG. 9A) between spacer elements is about 8.4 mm, the spacing 74 (represented by B in FIG. 9B) between transverse elements is about 2.75 mm, the width C of the spacer elements is about 1.2 mm, and the diameter 72 of the transverse spacer elements (represented by D and also by F+G) is about 0.7 mm. The angle H between the spacer and transverse elements is about 49°. With reference to FIG. 9B, the distance E between the facing membrane sheets is about 1.95 mm, and comprises the height of the spacer element 60 plus the gap represented by G. In an exemplary material, the gap is about 0.4 mm. (Accordingly, the distance F by which the spacer elements 60 are embedded into the transverse elements 70 is about 0.3 mm.) In the embodiment shown, the spacer elements have a rectangular or rounded rectangular cross-section. The indicated dimensions are exemplary only, and variations by about 10% in either direction would be expected to provide a similarly performing structure.

The spacer elements and transverse elements may have various shapes, as noted above; for example, the exemplary materials shown in FIG. 6 have spacer elements with a trapezoidal cross-sectional area; elements with square, rectangular, rounded rectangular, oval or circular cross-sectional areas, as well as irregular areas, can also be used. Preferably, the spacer elements have trapezoidal, rectangular, or rounded rectangular cross-sections. Typically, more regular shapes, such as circular cross-sectional areas, are preferred for the transverse elements (e.g. as shown in FIG. 7), to minimize interference with flow. In the case of a circular cross-section, the "height" of an element is equivalent to its diameter.

Figure 17:
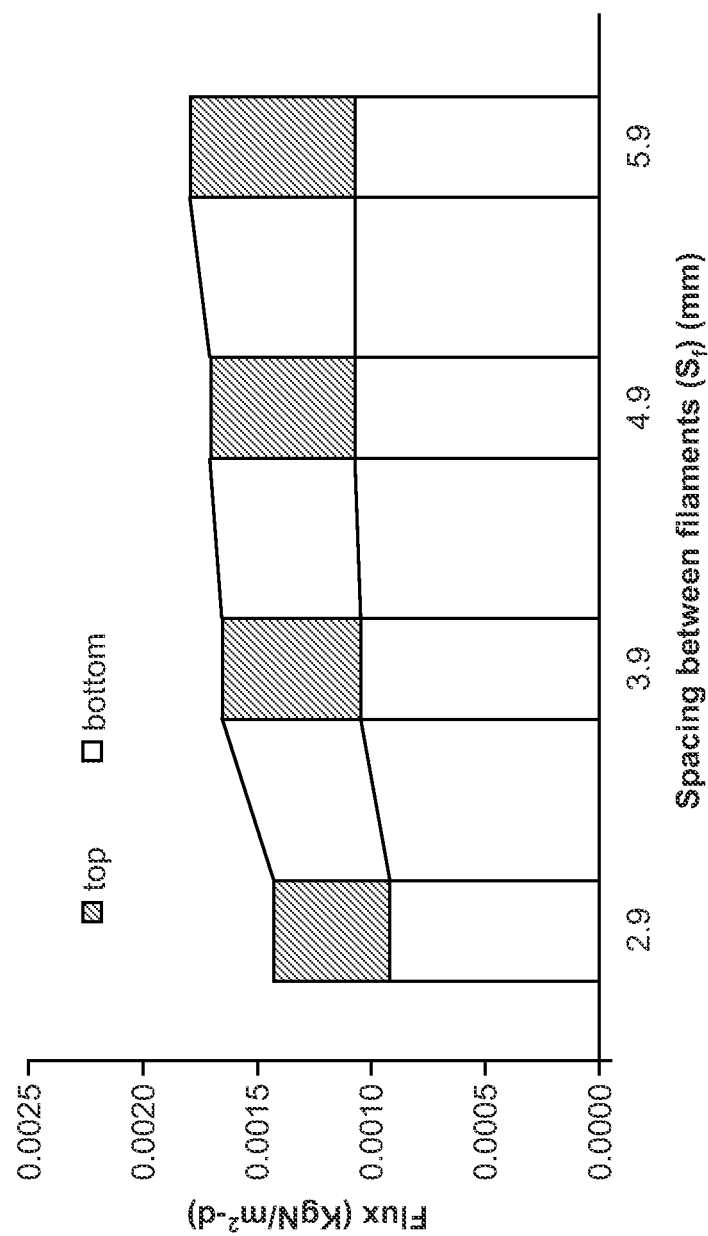
FIG. 17 is a graph showing nitrate flux vs. spacing between transverse elements within a channel, in the model study of FIG. 13.
Figure 18:
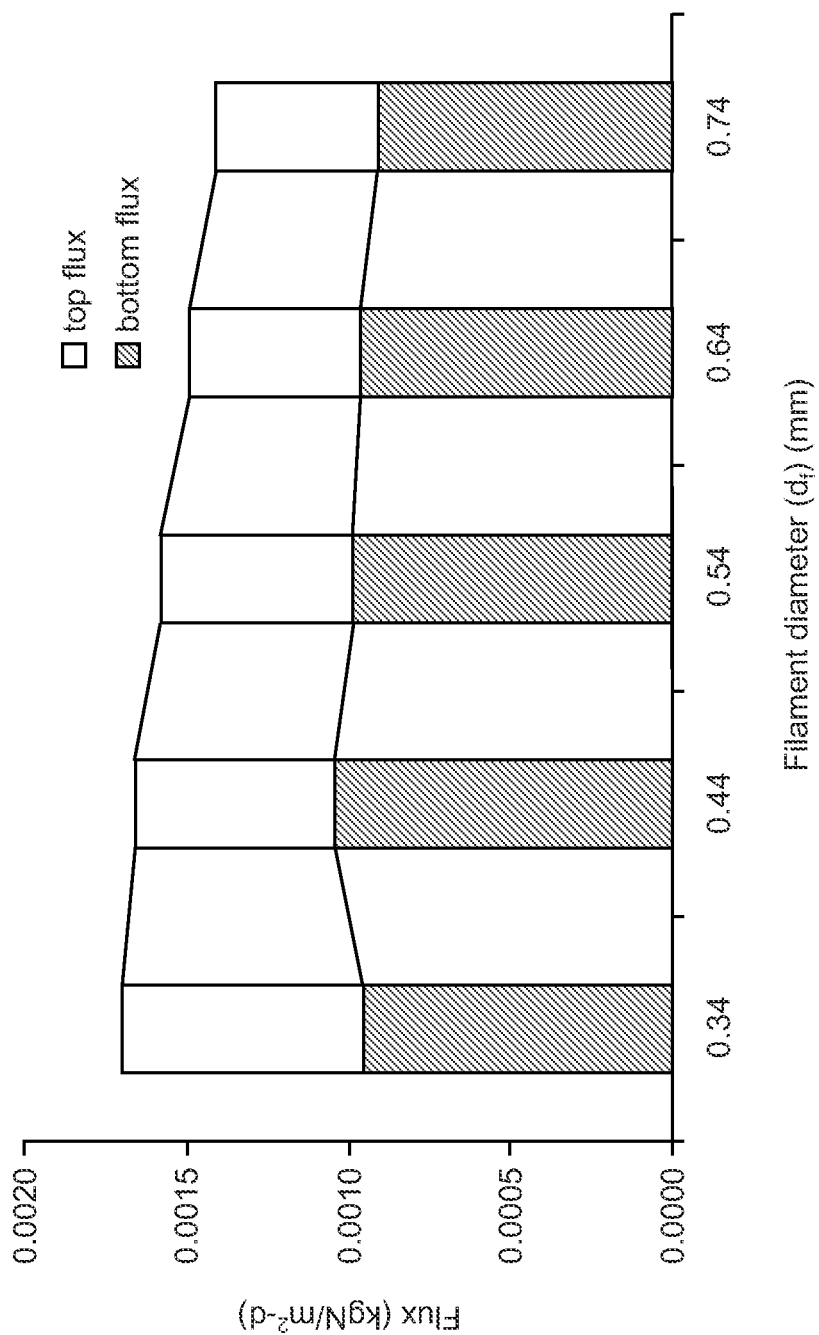
FIG. 18 is a graph showing nitrate flux vs. diameter of transverse elements within a channel, in the model study of FIG. 13.
Figure 19:
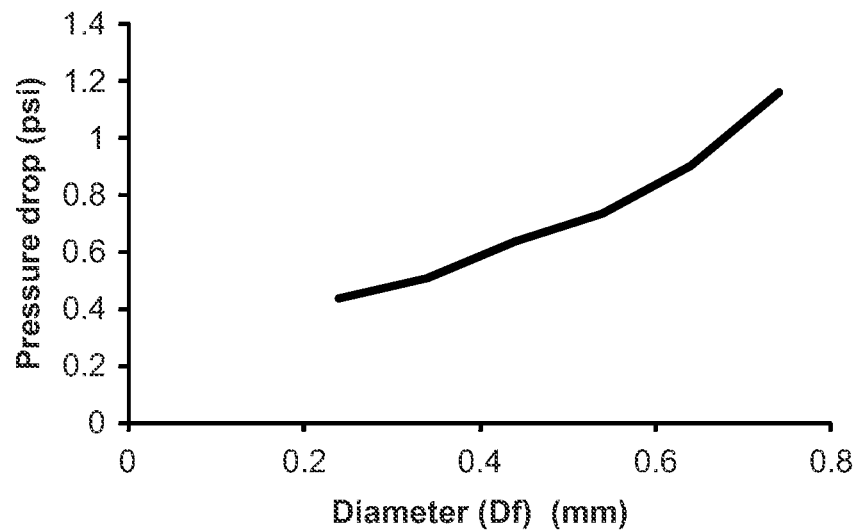
FIGS. 19 and 20 show the effect of spacing between transverse elements and diameter of transverse elements, respectively, on pressure drop, in the model study of FIG. 13.
Figure 20:
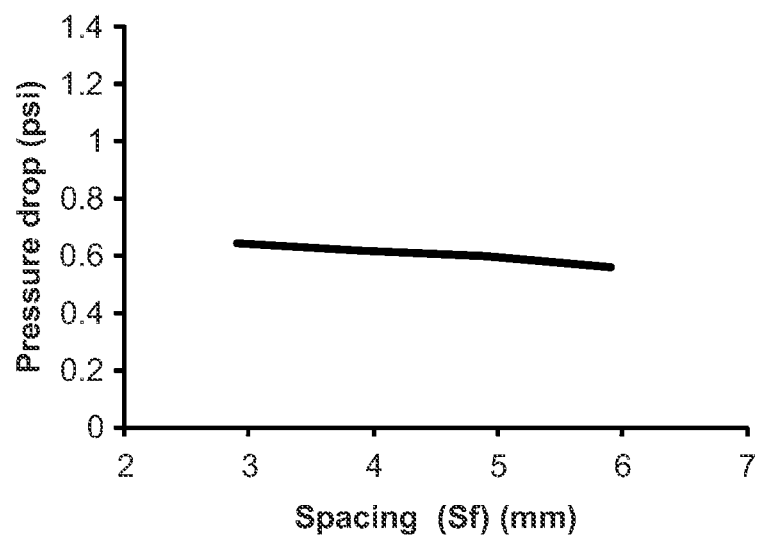

As described in the Experimental section below, the sizes and frequencies of the transverse elements, when present, can affect the influent flow, growth of biofilm, pressure drop, and flux (efficiency) of the module in a reactor. For example, as shown in FIGS. 18-19 and discussed further below, decreasing the diameter/height of the transverse elements from 0.74 mm to 0.34 mm in a model system decreased pressure drop and increased flux. In addition, as shown in FIGS. 17 and 20 and discussed further below, increasing the spacing between the transverse elements in a model system from 0.34 mm to 0.69 mm decreased the pressure drop, though not as significantly as decreasing diameter/height, and also increased flux.

In another embodiment of a spacer material, the parallel spacer elements, as described above, are integral with the membrane fabric sheets. That is, the spacer elements are directly incorporated into or onto the hollow fiber membrane sheets, e.g. by attachment or interweaving, and thus do not require a plurality of transverse elements to maintain positional stability. Although transverse elements could be present, and could be similar to the transverse elements described above, they would preferably be present at low frequency and/or high spacing, e.g. fewer than 1/inch, fewer than 1/foot, or fewer than 1/yard.

In one embodiment, there are essentially no transverse elements; i.e. the spacer elements are not physically connected to each other. See, for example, the embodiment of FIGS. 10A-10C (not necessarily drawn to scale). As used herein, "not physically connected to each other" means that the central, operative regions or the spacer elements, which form the channels for influent flow, are unconnected to each other. The spacer elements could be connected at their ends, e.g. at the edges of the membrane fabric sheets, without affecting flow though the channels formed by the spacer elements. The "central region" as used herein can be said to comprise 95% or more, typically 99% or more, of the total length of a spacer element. In FIGS. 10B-10C, a front view (FIG. 10B) and a side view (FIG. 10C) of an embodiment is shown, where individual hollow fibers 80 are shown making up (together with warp fibers 82) fabric sheets 62, which are separated by spacer elements 60.

Spacer elements can be directly incorporated onto or into the hollow fiber membrane sheets, in accordance with this embodiment, by various methods, including but not limited to the following. In one method, a solid monofilament of appropriate dimensions is woven in place of or in addition to, the regular warp fibers during the production of the fabric sheet, so as to provide substantially parallel ridges (spacer elements) on top of the fabric sheet. Alternatively, such solid monofilaments could be sewn or otherwise attached, e.g. by adhering with an adhesive, to the surface of premade hollow fiber membrane sheets. Other methods include extruding a solid bead of thermoplastic resin or microcrystalline wax, or sputter coating a thermoplastic resin, onto the surface of premade sheets of hollow fiber fabric, to provide appropriately sized ridges and flow channels on the fabric sheet. In another embodiment, a fabric sheet itself could be used as a "spacer", by crimping and heatsetting a sheet of hollow fiber fabric between two additional sheets, to form a corrugated structure similar to corrugated cardboard.

As noted above, the channels formed by the spacer elements between the hollow fiber membrane sheets, whether or not transverse elements as described are included, are expected to provide a predominantly spiral flow pattern through the module. This pattern differs from that described for modules having membrane sheets separated by more conventional spacers, which do not serve to direct flow and are believed to support a radial flow outward from the core tube.

IV. Multi-Module MBfR Tank Reactor System

Also provided herein is a reactor system comprising a plurality of modules, each in accordance with the description above, and an impermeable housing, such as a tank, containing the plurality of modules. The housing comprises a plurality of liquid influent ports, one in communication with the respective influent port of each of the modules, and at least one liquid effluent port.

The use of a common tank containing such modules provides several advantages. For example, this arrangements allows excess biomass from the hollow fibers to settle to the lower areas of the tank to be removed. Recirculation of water through a large amount of reactive surface area can also be accomplished efficiently.

In the reactor system, the hollow fibers of each module in the plurality are in fluid communication with the hollow fibers of every other module in the plurality; that is, a fluid, such as influent water, is able to follow a path from the hollow fibers of any given module to the hollow fibers of any other module. This can be achieved by providing modules in which a permeable retaining structure, such as a water permeable mesh, surrounds the hollow fiber membrane sheets and spacer materials.

The system is provided with at least one pump and with conduits effective to introduce a liquid influent into the core tube(s) or one or more of the plurality of modules, and to extract, preferably simultaneously, the liquid influent from the core tube(s) of one or more of the plurality of modules, and/or from within the retaining structures surrounding the hollow fiber membrane sheets, and/or from the region within the housing that is external to the retaining structures. This aspect is discussed further in Section V below.

Figure 11:
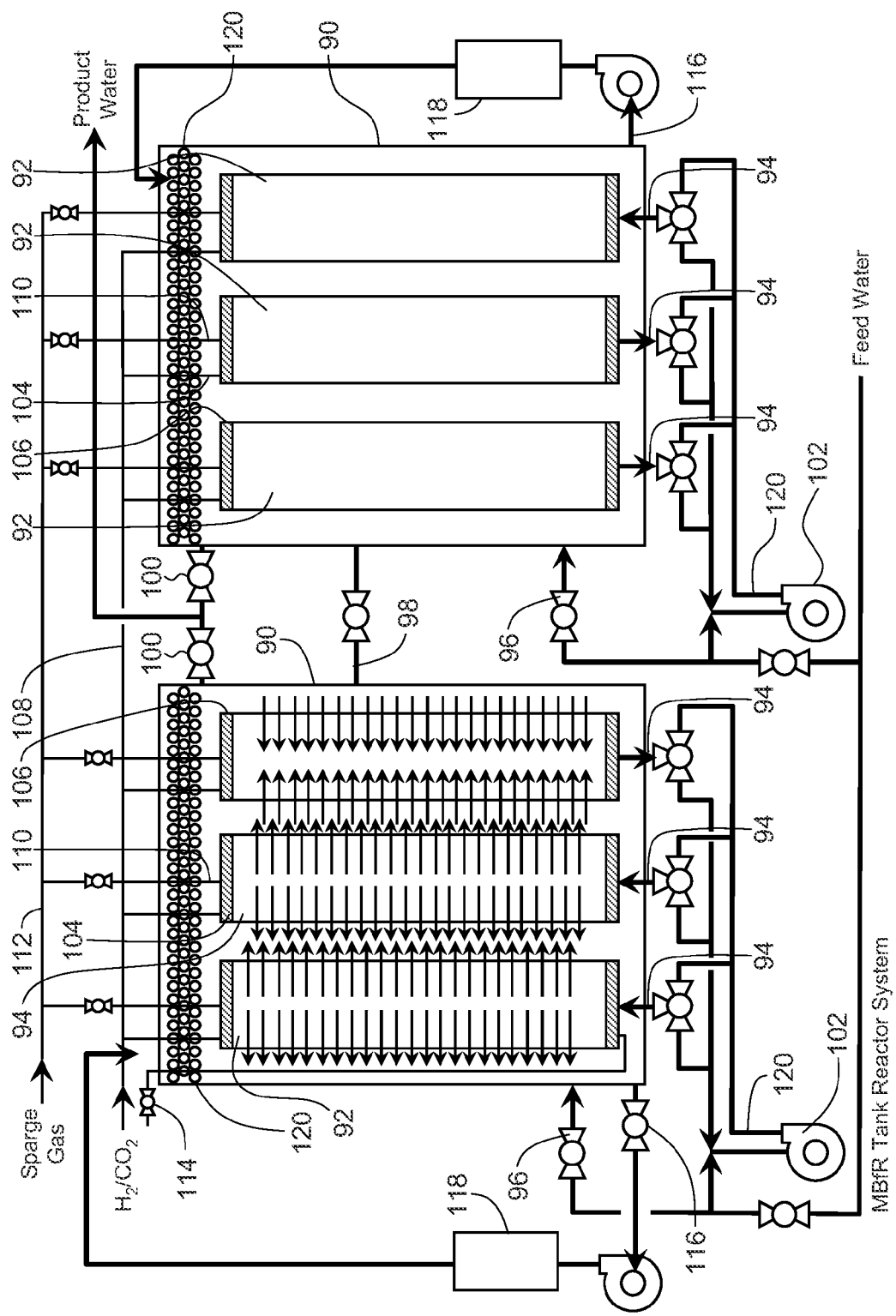
FIGS. 11 and 12 are embodiments of multi-module reactor systems, in accordance with various embodiments of the invention.

An example of an MBfR tank reactor system is shown in FIG. 11. The system comprises one or more tanks 90 (two in FIG. 11) containing MBfR modules 92 (a total of six in FIG. 11). An inlet/outlet port for treated water is provided for each module, as shown at 94. Feed water may also be provided directly to the tank(s) via inlet 96. When multiple tanks are used, as in FIG. 11, they may be connected by forwarding line 98. Each tank has an effluent port 100 for treated water. For circulation of water, at least one pump 102 is provided, equipped with three-way valves (or pairs of two-way valves to provide the same flow-diverting functionality).

The system includes reagent gas inlets 104 to communicate with the gas distribution area 106 of each module, preferably via a manifold 108. Similarly, sparge gas inlets communicate with the sparge gas tube 110 of each module, preferably via a manifold 112.

Each module includes an inerts drain 114 (illustrated for just the first module in FIG. 11), to drain material from the lumens of the hollow fibers. Each tank has a tank drain 116, which can be used to remove excess biomass sloughed off from the exterior surfaces of the hollow fibers. The drain output may be filtered (118) for recirculation if desired.

Figure 12:
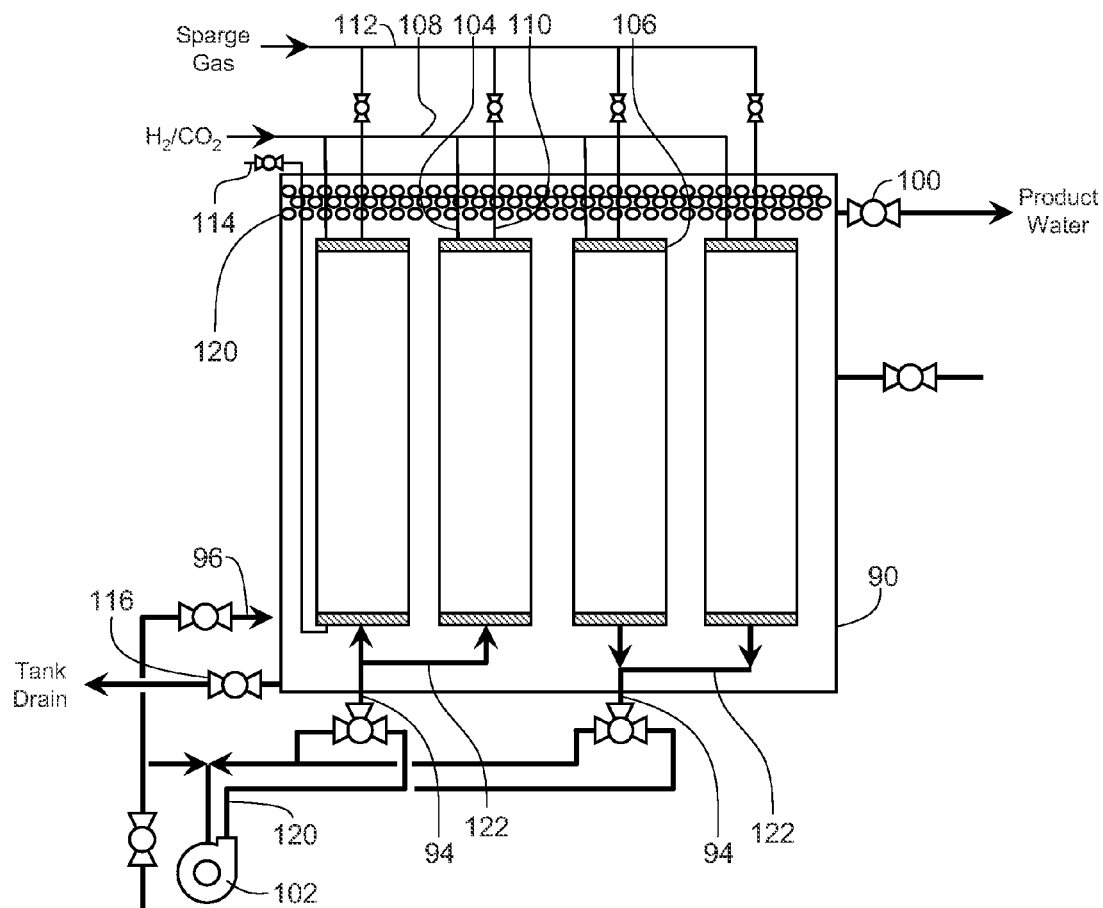

Each tank reactor may also contain a floating packing material 120, constructed of an inert material such as polypropylene. The packing, which is typically in the form of spheres but can take any shape, fills the top of the tank, as shown in FIGS. 11 and 12. The packing may be of any depth that is accommodated by the depth of the tank and the buoyancy of the packing.

The packing material provides several functions. For example, it provides a surface for deposition of heterotrophic microbes, which use carbon as their electron source for reduction and thus would be effective to reduce carbon-containing material present in the treated water. Additionally, a secondary source of carbon, such as acetate, methanol, or ethanol, could be dosed at less than stoichiometric requirements, to provide an electron donor for partial reduction of oxidized contaminants.

A second function provided by the packing is to allow any gas, such as nitrogen produced in the reduction of nitrate, to escape the reactor.

A third function provided by the packing is to reduce the intrusion of oxygen into the water being treated. The reduction of oxygen by hydrogen in the MBfR system is very rapid and consumes hydrogen. Minimizing the amount of oxygen entering the water reduces the use of hydrogen, thus reducing operation costs.

Instrumentation associated with the reactor is not shown in the Figs. but could include, for example, instrumentation for monitoring and/or control of pH, pressure, temperature, water flow, Oxidation Reduction Potential (ORP), and Lower Explosive Limit (LEL), mass flow meters for gases, and a Programmable Logic Controller.

FIG. 12 shows a system in which a "module" comprises more than one MBfR, where the core tubes of each MBfR are connected by a common header 124. Each MBfR is equipped with reagent gas addition, sparge gas addition, and an inerts drain (shown for only the first MBfR) as above.

V. Method of Water Treatment

In treatment of water in the reactor systems described above, a reagent gas, such as hydrogen or hydrogen/carbon dioxide, is introduced into the inner lumens of the hollow fibers, and a liquid influent, such as water to be treated, is introduced into the core tube(s) of one or more of the plurality of modules. The gas and/or liquid influent support the growth of a biomass, which is effective to remove contaminants from the liquid influent, on the external surfaces of the hollow fibers. Treated effluent liquid is collected at the liquid effluent port(s) of the reactor housing.

During operation, material can be drained, either periodically or continuously, from the lumens of the hollow fibers through the drain port(s).

Another aspect of the invention is directed to patterns of flow of water through the multi-module tank reactor system (s) described above. It has been demonstrated that flow reversal removes excess biomass from the Fiber surfaces, reducing biofouling. In particular, flow reversal in one MBfR module, coupled with forward flow in another MBfR module in the same tank, improves module performance and minimizes biomass accumulation within the MBfR modules.

As described above, in the reactor system(s), the hollow fibers of each module are in fluid communication with the hollow fibers of every other module; that is, a fluid, such as influent water, is able to follow a path from the hollow fibers of any given module to the hollow fibers of any other module. This can be achieved by providing modules in which a permeable retaining structure, such as a water permeable mesh, surrounds the hollow fiber membrane sheets and spacer materials.

Thus, the method of treatment may comprise introducing a liquid influent, such as wastewater to be treated, into the core tube of one or more of the modules, such that the liquid influent contacts the biomass on the external surfaces of the hollow fibers, and extracting, preferably simultaneously the liquid influent from the core tube(s) of another one or more of the modules, and/or from within the retaining structures surrounding the hollow fiber membrane sheets, and/or from the region within the housing that is external to the retaining structures.

Generally, this operation is followed by altering the flow of liquid influent within the housing, such that the liquid influent is introduced into the core tube(s) of a different module than that used initially for introduction, simultaneously extracted from the core tube(s) of a different module from that used initially for extraction.

An example of this system of water circulation, which can be described as "Push-Pull", can be illustrated with reference to FIG. 11. In FIG. 11 Tank 1, the flow of water is "Pushed" into the core tube of Modules 1 and 2 by Pump 1. The water then flows out of the core tube(s), over a biofilm on the hollow-fiber membranes in the fabric sheets, predominantly following the path(s) of the spacer elements, and eventually reaches the interior region of the tank external to the modules, as shown b the small arrows within the representation of Tank 1. In Module 3 of Tank 1, the water flow is, preferably simultaneously, "Pulled" by Pump 1 from the interior of the tank, over the hollow-fiber membrane fabric sheets, and into and through the core tube, as shown by the small arrows within the representation of Tank 1.

The flow of water can then be altered such that water is "pushed" into Module 3 and "pulled" from one or more of Modules 1 and 2. Preferably, the "Push-Pull" process is coupled with the periodic introduction of sparge gas into the core tube, through sparge tubes 110. An exemplary sparging gas is nitrogen, although other gases are likely to produce satisfactory results. Since gas sparging typically involves the release of gas into the atmosphere, the use of flammable or toxic gases is less desirable.

Shown in Table 1 is an example of a possible sequencing of "Push-Pull" and sparge gas injection. In Sequence 1, the water is "pushed" into Modules 1 & 2 and "pulled" through Module 3, as described above and illustrated in FIG. 11, for 6 minutes. During the last minute, sparge gas is introduced into Module 2. Subsequently, in Sequence 2, the water is "pushed" into Modules 2 & 3 and "pulled" through Module 1 for 6 minutes. During the last minute of Sequence 2, sparge gas is introduced into Module 3. In Sequence 3, the water is "pushed" into Modules 1 & 3 and "pulled" through Module 2 for 6 minutes; during the last minute of Sequence 3, sparge gas is introduced into Module 1. The process would then restart with Sequence 1.

TABLE 1

Exemplary Push-Pull and Gas Sparge Sequence

| Sequence No. | Time period | Water Flow Sequence | | | Sparge Gas Sequence | | |
|---|---|---|---|---|---|---|---|
| | | Module 1 | Module 2 | Module 3 | Module 1 | Module 2 | Module 1 |
| 1 | 5 min | Push | Push | Pull | | | |
|   | 1 min | Push | Push | Pull | | sparge | |
| 2 | 5 min | Pull | Push | Push | | | |
|   | 1 min | Pull | Push | Push | | | sparge |
| 3 | 5 min | Push | Pull | Push | | | |
|   | 1 min | Push | Pull | Push | sparge | | |

The sequencing shown in Table 1 is exemplary only. Any parameter selected from the number of modules in "Push" or "Pull" mode, the time of the sequence, and the length of time of the sparge, can be altered. If more than one tank reactor is used, each tank of modules could have the same or independent sequencing.

The "Push-Pull" process, alone or in combination with and gas sparging, is useful for maintaining an optimum biofilm thickness on the outside of the membrane hollow fibers, thus improving the mass transfer of contaminants in the water to be placed in contact with the active microbes in the biofilm. The excess biomass dislodged by the "Push-Pull" strategy and/or gas sparging settles to the bottom of the tank and can be drained from the tank as required.

Mass transfer can also be improved by adjusting the recycle rate, which refers to the flow of water around the tank reactor. Generally, increasing recycle now rate improves mass transfer of the contaminant into the biofilm. The optimum recycle rate will depend on the contaminant to be reduced and general water quality of the water being treated. Typically, the recycle rate is 2 to 10 times the flow of the feed water. If more than one tank reactor is used, the recycle rate may be different or be the same in each tank reactor. In one preferred embodiment, the flow rate of influent fluid is increased during introduction of the sparge gas Increasing hydrogen pressure in the lumen of the hollow fibers can also be used to increase the efficiency of the MBfR in reducing contaminants. The hydrogen pressure is affected by the polymeric material used to make the membrane hollow fiber (e.g. polypropylene, polyester, cellulose triacetate), the thickness of the wall of the membrane hollow fiber, the number of interleafs, and the diameter of the MBfR module. Typically, the hydrogen pressure in the lumen of the hollow fiber is 15-30 psi.

Carbon dioxide may also be introduced into the lumen of the hollow fiber, to control the pH of the water, particular in the reduction of some oxidized materials, such as nitrate, which produces hydroxide as a byproduct. Carbon dioxide or other pH-adjusting materials, such as hydrochloric, sulfuric or phosphoric acid, can also be introduced directly into the water being treated, as shown in FIGS. 11 and 12 at 122. If carbon dioxide and hydrogen gas are both introduced into the lumen, the partial pressure of hydrogen is controlled at 15-30 psi. The partial pressure of carbon dioxide is controlled by the pH of the water being treated.

An exemplary use for the present radial flow MBfR, as noted above, is for water treatment. MBfR can be used to remove a variety of water-borne contaminants, some of which are identified above. MBfR devices as described herein can be used in combination with other water treatment processes, so long as chemicals present in the water do not interfere with the formation and maintenance of the biofilm in the MBfR or the metabolic activity of the microorganisms in the biofilm. Water containing chlorine has been treated by the MBfR technology, and the chlorine did not appear to negatively affect the biofilm.

VI. Materials for Use in Hollow Fibers, Warp Fibers, and Spacer or Interleaf Materials A. Hollow Fibers One class of compounds useful for the production of hollow fibers for use in MBfR devices is the polyesters. Esters can also be formed from phosphoric, sulfuric, nitric, boric, benzoic, and other acids. Esters participate in hydrogen bonding as hydrogen-bond acceptors but do not function as hydrogen donors. This allows esters groups to form hydrogen bonds with many other functional groups, while precluding hydrogen-bonding between ester groups. Esters are generally hydrophobic, although the nature of the acid and alcohol used to form the ester affects the characteristics of a particular ester.

Polyesters include but are not limited to poly(ethylene terephthalate) (PET), poly(trimethylene terephthalate) (PTT), poly(butylene terephthalate) (PBT), poly(ethylene naphthalate) (PEN), poly(cyclohexylene dimethylene terephthalate) (PCTA), polycarbonate (PC), poly(butylene naphthalate) (PBN), and poly(lactic acid) (PLA). Polyesters may be homopolymer or heteropolymers. As used herein, heteropolymers include copolymers. A common polyester copolymer is 1,4-cyclohexanedimethanol (CHDM). For example, PCTA is a copolymer of three monomers, which are terephthalic acid, isophthalic acid, and CHDM. While some industries use the terms "polyester" and "PET" almost interchangeably, the term "polyester" refers to the entire class of compounds.

Many of the advantages of polyester are most apparent when fibers are tossed or woven into tows, ropes, fabrics, etc. For example, polyester is widely used in the textile industry. The most widely used polyester is PET (or PETE), which exists in amorphous (transparent) and semi-crystalline (white or opaque) forms and is readily made into fibers and sheets. PET and another polyester of a dihydric alcohol and terephthalic acid are commonly used to make rope.

In addition to being inexpensive to produce, polyesters are particularly strong, resilient, resistant to abrasion, and resistant to stretching and shrinking. Polyester textiles are wrinkle resistant, mildew resistant, fast drying, and retain heat-set pleats and creases. Polyester displays excellent resistance to oxidizing agents, cleaning solvents, and surfactants. While resistant to sunlight, UV stabilizers are typically added for use outdoors or exposed to UV light.

Polyesters, like most thermoplastics, are recyclable and may be may be virgin polyesters, recycled polyesters, post consumer polyesters, recycled monomers, or combinations and variations, thereof. Some polyesters, including PET, offer the additional advantage of containing only carbon, oxygen, and hydrogen (i.e. no sulfur, phosphorus, nitrogen, etc.), which makes them candidates for incineration.

Exemplary polyester hollow fibers are made of melt-spinnable polyester, such as PET, that is melted and pressed through a hole of a spinneret, quenched in water or in an air stream, stretched in one or more steps in combination with heating, and then wound onto on a spool using a winding machine.

Other polymers useful for formation of the hollow-fiber membranes include halogenated polyolefins and non-halogenated polyolefins. Examples of the latter include polypropylene (PP) and polymethylpentene (PMP).

The hollow fibers are fine, effectively "endless" flexible hollow polymeric tubes, which can be cut to any length as needed. The fibers have an exterior surface that is typically exposed to the wastewater, and an interior surface for interacting with sparged gas. The interior surface defines a hollow interior space.

The preferred outside diameter (OD) of the hollow fibers for use in the spiral flow MBfR depends on the particular embodiment. Preferred fiber diameters for use as described are from about 50 µm to about 5,000 µm (OD), or even from about 0.10 mm to about 3,000 µm. One preferred diameter is about 300 µm. In selected embodiments, the hollow fibers are less than 500 µm in diameter, or less than 100 µm in diameter. The fibers may even be less than 50 µm, less than 20 µm, or less than 10 µm in diameter. In one embodiment, the membranes have an outer diameter of 200 µm and a thickness of 50 µm.

The optimal shape of hollow fibers is round, although irregular shapes are expected to produce satisfactory results. Consistent density is preferred but not required. The hollow fibers may have a uniform diameter or be heterogeneous with respect to diameter. Where the fibers are of heterogeneous diameter, the diameter may fall within a preselected range.

An acceptable range for void volume is from about 1% to about 99%, while a preferred range for some embodiments is from about 25% to about 50%. Preferred tenacity (T) values are from about 10 to about 80 cN/tex, or even from about 20 to about 60 cN/tex.

B. Warp Fibers and Spacer or Interleaf Materials

Warp fibers and spacer or interleaf materials can be made from any stable polymeric material; preferred materials include cellulose triacetate, various polyesters, polypropylene, polyethylene, polyurethane, and composites thereof.

The warp fiber preferably have an outside diameter of about 100-500 µm, about 150-450 µm, or about 200-400 µm. In one example, the warp fiber is 150 denier textured polyester having an outside diameter of about 300 µm and an inside diameter of about 150 µm. Other dimensions and a range of from about 75 to about 300 denier texture polyester are also expected to produce satisfactory results.

VII. Selection of Microorganisms

The MBfR device has been exemplified for nitrate reduction using autotrophic bacteria and a hydrogen gas as an electron donor as previously described. However, the device can be used with many types of contaminants and suitable microorganisms. Oxidized contaminants include but are not limited to nitrate, nitrite, perchlorate, chlorate, bromate, halogenated and non-halogenated organic contaminants, etc.

Removal of nitrogenous contaminants is usually performed by denitrifying bacteria or "nitrifiers", which include two major groups of aerobic, chemolithoautotrophic bacteria. Ammonia-oxidizing bacteria oxidize ammonia to nitrite, and nitrite-oxidizing bacteria (NOB) oxidize nitrite to nitrate. The first process is performed by a number of facultative anaerobes commonly found in soil. The second process, sometimes referred to as "true" denitrification, is performed by a more select group of bacteria exemplified by *Paracoccus denitrificans, Alcaligenes eutrophus, Alcaligenes paradoxus, Pseudomonas pseudoflava, Vibrio dechloraticans* Cuznesove B-1168, *Acinetobacter thermotoleranticus, Ideonella dechloratans*, GR-1 (a strain identified to belong to the β-Proteobacteria, *Paracoccus denitrificans, Wolinella succinogenes*, and *Ralstonia eutropha. Pseudomonas pseudoflava, Alcaligenes eutrophus, Alcaligenes paradoxus, Paracoccus denitrificans*, and *Ralstonia eutropha* can all use hydrogen gas as an electron donor. *Ralstonia eutropha* is a preferred bacteria available from the American Type Culture Collection (ATCC; Manassas, Va., USA) as collection number 17697.

Perchlorate-reducing bacteria are generally facultative anaerobes or microaerobes. The bacteria use acetate, propionate, isobutyrate, butyrate, valerate, malate, fumerate, lactate, chlorate, and oxygen as electron donors but typically not methanol, catechol, glycerol, citrate, glucose, hydrogen, sulfate, selenate, Mn(IV), or Fe(III). Most perchlorate-reducing bacteria are Proteobacteria. *Dechloromonas, Dechlorosoma*, and strain GR-1 are β-Proteobacteria, while *Azospirillum* is an α-Proteobacteria. Strains of *Dechloromo-* nas and *Dechlorosoma* can use lactate as an electron donor, and strains of *Dechlorosoma* can use ethanol as an electron donor. With the exception of three *Dechloromonas* strains, all perchlorate-reducing bacteria can use nitrate as an electron acceptor. Some autotrophic *Dechloromonas* strain use hydrogen as an electron donor. Such strains are particularly useful for use with the present apparatus, systems and methods.

Hydrogen-oxidizing bacteria include both hydrogen-oxidizing, autotrophic bacteria and bacteria able to utilize organic carbon and other energy sources in addition to hydrogen. Hydrogen-oxidizing bacteria are preferred in some embodiments of the present apparatus, systems, and methods. In the presence of oxidized contaminants, such bacteria reduce an oxidized form of a primary electron acceptor in a sufficient amount to sustain a viable, steady-state biomass within the aqueous water-treatment system. Deriving energy for growth via reduction is referred to as a dissimilatory reduction. Examples of hydrogen-oxidizing bacteria include but are not limited to *Pseudomonas pseudoflava, Alcaligenes, eutrophus, Alcaligenes paradoxus, Paracoccus denitrificans*, and *Ralstonia eutropha*, which can all used nitrate, and a *Dechloromonas* strain, which can use perchlorate.

One or more (i.e., combinations) of the above-identified bacteria can be inoculated into a radial flow MBfR and allowed to Form a biofilm on the outside of the hollow fibers. Bacteria that require similar growth conditions (e.g., sparging with the same gas) may be grown in the same biofilm, while bacteria with different growth requirements are typically grown in different bioreactors.

Alternatively or additionally, endogenous bacteria in waste water or ground water are allowed to form a biofilm in a reactor. This method has the advantage that the bacteria present in the waste water or ground water are already adapted to the available nutrients and; therefore, are already capable of metabolizing oxidized contaminant in the influent water.

VIII. Experimental

The studies described below investigated the spatial distribution and performance or MBfR biofilms in a MBfR model system containing spacers with transverse elements. Computational fluid dynamics and IPB (Individual Particle Based) modeling were used to examine a spiral-wound MITER treating nitrate ($NO_3^-$)-containing drinking water via autotrophic, ft-based denitrification. The objective of the study was to investigate the two-dimensional microenvironment of an MBfR biofilm growing on a complex geometry and the effect of the geometrical configuration of spacer materials on the growth of the biofilm and efficiency of the reactor.

The modeling domain used for the study consisted of a single channel within a model reactor, formed by two inert spacer elements as described above, with hollow-fiber membrane sheets above and below, and inert transverse elements adjacent to the bottom membrane. (See FIG. 7.) FIG. 7 shows a cross-sectional view, looking in a direction perpendicular to the spacer elements and parallel to the transverse elements (shown in circular cross-section), of a portion of the single channel defined by two parallel spacer elements. The irregular lines at the top and bottom surfaces represent the facing hollow-fiber membrane sheet surfaces. Hydrogen was provided to the hollow fibers, and the nitrate-containing liquid feed (water) flowed from left to right in the figure.

The membranes had an outer diameter of 200 μm and a thickness of 50 μm. The diffusivity of $H_2$ through the membrane was estimated to be $63.7 \times 10^{-12}$ m$^2$/s from previous gas transfer experiments on dense membranes (data not shown). The operating parameters for the flow cell were as follows, unless otherwise indicated: 7.5 psi(g) intramembrane II, pressure; 1.5 L/min recirculation; phosphate based minimal media with 15 mg/l, nitrate; influent rate of 1 mL/min.

A variety of geometrical configurations and operating conditions were tested. Two design parameters in particular were studied: the distance between transverse elements in the spacer elements and their diameter. For the base case scenario, the distance between the transverse elements ($S_f$) was 3.9 mm, and the diameter ($D_f$) was 0.44 mm.

The effect of substrate concentration was tested by varying the concentration of $NO_3^-$ in the bulk liquid and the $H_2$ intra-membrane pressure. The effect of spacer design was evaluated by testing various transverse element diameters and distances between transverse elements (also known as the mesh length). Each simulation was modeled for 30 days, with a time step of 6 hours. The parameters tested are shown in the Table below.

TABLE 2

Simulation Scheme

| | Distance between transverse elements (filaments) ($S_f$) (mm) | Transverse element diameter ($D_f$) (mm) | $NO_3^-$ concentration (mg N/L) | $H_2$ intra-membrane pressure (psi$_g$) |
|---|---|---|---|---|
| Base ease | 3.9 | 0.44 | 1 | 25 |
| Varying distance between transverse elements (mesh length) | 2.9 | 0.44 | 1 | 25 |
| | 4.9 | 0.44 | 1 | 25 |
| | 5.9 | 0.44 | 1 | 25 |
| Varying transverse element diameter | 3.9 | 0.24 | 1 | 25 |
| | 3.9 | 0.34 | 1 | 25 |
| | 3.9 | 0.54 | 1 | 25 |
| | 3.9 | 0.64 | 1 | 25 |
| Varying bulk liquid $NO_3^-$ concentration | 3.9 | 0.44 | 0.5 | 25 |
| | 3.9 | 0.44 | 2.5 | 25 |
| | 3.9 | 0.44 | 5 | 25 |
| Varying intramembrane $H_2$ pressure | 3.9 | 0.44 | 5 | 10 |
| | 3.9 | 0.44 | 5 | 25 |
| | 3.9 | 0.44 | 5 | 40 |

Biofilm Development and Changes in Flow Regime

Biofilm development and the corresponding changes in flow regime were studied for the base case. At time zero, recirculation regions formed behind the transverse elements, in accordance with the filtration literature (Schwinge et al., 2002, *Ind. & Eng. Chem. Res.* 41:2977-2987). These regions offered a low shear zone for the biofilm to grow. As the biofilm developed, the flow regime changed accordingly. At day 5, changes in the geometry due to biofilm growth caused the recirculation zones to no longer fill the spaces between the transverse elements, though the whole space continued to experience low shear. At day 10, it appeared there was more detachment directly behind the transverse elements, where the area of recirculation was greatest. Eventually, the biofilm reached a pseudo-steady state where detachment caused the biofilm thickness to fluctuate around an average. At pseudo-steady state, little biofilm was able to grow on the top of the transverse elements, nor on the top membranes, due to the high shear stress exerted on these boundaries. Most of the biofilm grew on the bottom membranes, under the protection of the transverse elements. (However, in larger scale experimental studies, significantly more biofilm was observed to grow on the upper membrane.) At day 23, a small recirculation zone formed in an area that had recently lost biofilm due to sloughing. At day 30, the biofilm exhibited a heterogeneous morphology, with many isolated recirculation zones formed from detachment of biofilm.

In all cases, the highest biological activity occurred near the outside of the biofilm (i.e. the areas farthest from the membranes). $H_2$ diffused to the outside of the biofilm, where nitrate was quickly consumed. Therefore, the inner regions of the biofilm remained inactive and served as a diffusion barrier to $H_2$. Thinner biofilms are thus expected to be more effective for low to moderate nitrate loadings; however, thicker biofilms may be required for effective treatment of higher nitrate loadings.

Figure 13:
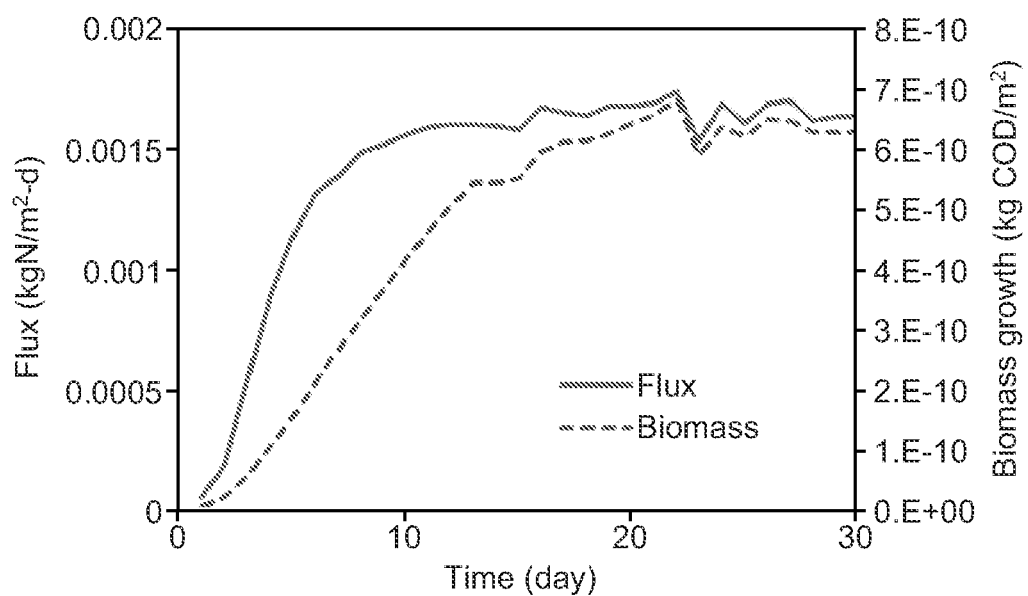
FIG. 13 is a graph showing increase in nitrate flux and biomass growth with time, in a model study of a membrane biofilm reactor module.

Nitrate flux can be used as a measure of the reactor's performance. The change in nitrate flux with growth in biomass is shown in FIG. 13. The biomass is expressed as a concentration of COD per length of flow channel, and the flux is expressed as mass of nitrogen per area of channel per day. Both curves reached a pseudo-steady state wherein detachment of the biofilm caused fluctuations around an average equilibrium value. However, the flux steady state was reached much sooner than that of the biomass; further growth in biomass, under these conditions, only increased the amount of inactive biomass. The large drop in biofilm around day 20 was due to the detachment of a large piece of biofilm.

Flux with Varying $NO_3^-$ Concentrations

Figure 14:
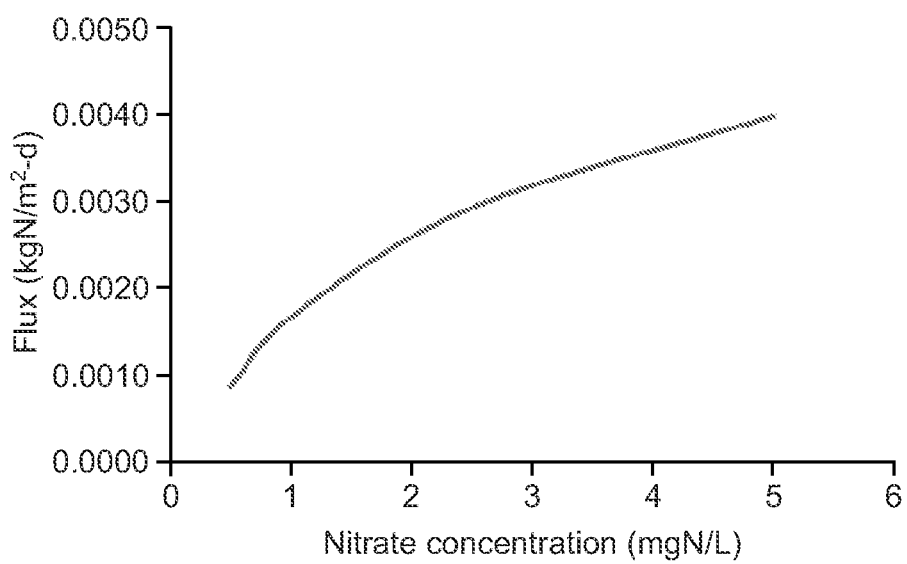
FIG. 14 is a graph showing nitrate flux vs. nitrate concentration, in the model study of FIG. 13.

The spiral-wound MBfR module with base case conditions was tested under varying bulk liquid $NO_3^-$ concentrations. The flux results in FIG. 14 show that as $NO_3^-$ increased, the flux also increased, although with diminishing returns. If the curve were extended, it would eventually reach an asymptote, where increases in $NO_3^-$ concentration would not result in increases in flux. At this point, the system would be $H_2$ or biomass-limited or both. The highest activity was observed to move further into the biofilm (from the edges) as the $NO_3^-$ concentration increased.

Figure 15:
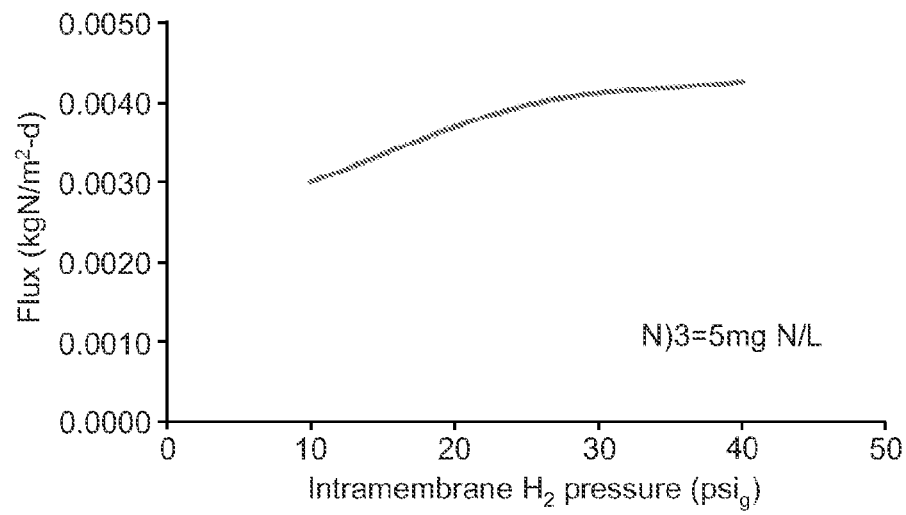
FIG. 15 is a graph showing nitrate flux vs. intramembrane hydrogen pressure, in the model study of FIG. 13.

FIG. 15 shows the changes in flux when the NO and geometry are held constant, but the $H_2$ intramembrane pressure is varied. The biofilm was limited by $H_2$ at an intramembrane pressure of 10 psi. At pressures of 25 and 40 psi, the biofilm performed similarly, indicating that $H_2$ was no longer limiting. As with the flux vs. $NO_3^-$ loading curve (FIG. 9), the flux is expected to reach an asymptote, where increased pressure would not result in increases in flux.

In general, the highest activity was seen to occur in thinner regions of the biofilm, where neither $NO_3^-$ nor $H_2$ encountered diffusional resistance.

Effect of Transverse Element Spacing

Figure 16:
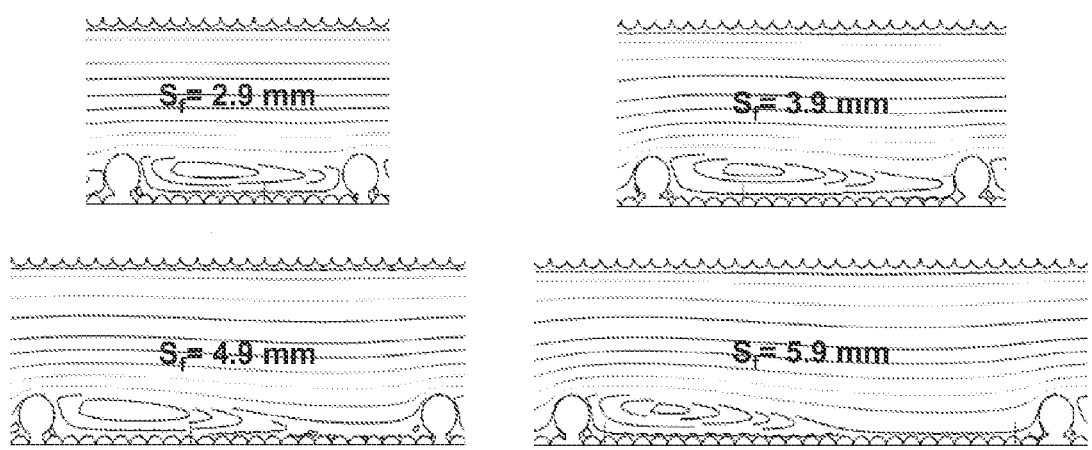
FIG. 16 shows flow shear patterns within a channel containing transverse elements at different spacings, in the model study of FIG. 13.

Transverse element spacing ($S_f$) affected the shape and area of the low shear zones, which in turn affected the biofilm morphology. FIG. 16 depicts the low shear zone between two transverse elements at time 0 for each of the scenarios tested. For an $S_f$ (spacing) of 2.9 mm and 3.9 mm, the low shear zones were fully recirculated. As the transverse elements moved farther apart, the low shear zone became more asymmetrical in shape, and the region was no longer fully recirculated.

FIG. 17 depicts the average flux at steady state at the top and bottom membrane boundaries. (In the bar graphs in FIGS. 17-18, flux at the top and bottom membranes is indicated by the top and bottom portions, respectively, of the bars.) The lowest spacing (2.9 mm) provided the lowest fluxes on the bottom membrane, mainly due to the difference in surface area available per length of channel. There was very little apparent difference in flux at the bottom membrane for the spacing values of 3.9, 4.9, and 5.9 mm.

The most significant difference in flux occurred at the top membrane. As spacing increased, more biofilm was allowed to grow on the top membrane, which was a biomass-limited region for the conditions tested.

Effect of Transverse Element Diameter

The depth of the recirculation region increased with transverse element diameter (height) due to flow around the element. This allowed the biofilm to grow thicker, resulting in decreased flux under the given conditions.

Transverse element diameter also influenced the shear stress exerted at the top surface of the channel. The smaller the diameter, the lower the velocity and shear stress felt at the top membrane boundary. As the diameter of the transverse elements decreased, the $NO_3^-$ flux at the top membrane boundary increased, due to greater biofilm growth in this biomass-limited region (FIG. 18).

The flux at the bottom boundary was seen to increase when transverse element diameter was increased from 0.34 mm to 0.44 mm. At a diameter of 0.34 mm, the bottom boundary was biomass-limited, since the transverse element offered less protection. However, on further increase in diameter, flux decreased at the bottom membrane.

Pressure Drop

The pressure drop was calculated for each of the scenarios tested, assuming a 12 foot membrane sheet (length). Of the variables tested, the diameter of the transverse elements had the greatest affect on pressure drop, since flow was forced around these elements, effectively narrowing the channel (FIG. 19). Increasing the distance between the transverse elements reduced the pressure drop (FIG. 20); however, the effect was less significant.

Biofilm development seemed to have little effect on the pressure drop (data not shown). Because biofilm grew within the low-shear zones formed by the transverse elements, it had little influence on changing channel flow. Similarly, increases in nitrate concentration had little effect on pressure drop (data not shown).

Biomass control is of great importance in module and in an MBfR. One way to manage the biofilm is to control the areas of low and high shear by altering the diameter or the distance between transverse elements, when present. In this study, smaller diameters led to more shear stress at the bottom membrane, equating to less protection for biomass growth, and less shear at the top membrane, equating to more protection for biomass growth. In addition, for the conditions tested, the greater the spacing between transverse elements, the lower the average shear stress experienced at the top membrane.

As shown in the results above, the diameter ($D_f$) of the transverse elements and the distance between them ($S_f$) affect the high and low shear zones, which determine the location and amount of biofilm growth. A greater spacing between transverse elements appeared to support better performance by allowing for more membrane surface area per length of channel.

For the given flow rate, it was qualitatively observed that biofilm behind the transverse elements could grow to a thickness of $D_f$, but no thicker. By decreasing the diameter ($D_f$) of the transverse element, thicker biofilms could be grown on the top membrane, which tended to be underutilized, and thinner biofilms on the bottom membrane, which was desirable for the base case loadings. Growth on the top membrane could also be increased by increasing the spacing between transverse elements ($S_f$).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

It is claimed:

1. A membrane biofilm reactor module, comprising:
   a perforated core tube, having an interior which is in communication with a liquid influent port and a source of sparging gas, and
   a plurality of gas-permeable hollow fibers, each having an exterior surface, an interior surface that defines an inner lumen, a first open end, and a second open end which is in communication with a source of reagent gas,
   wherein the hollow fibers are interwoven with warp fibers to form one or more hollow fiber membrane sheets, wrapped around said core tube to form adjacent facing layers, and
   a plurality of substantially parallel, rectangular spacer elements positioned between said adjacent facing layers of hollow fiber membrane sheets, effective to maintain open flow channels between said adjacent facing layers;
   wherein said parallel spacer elements are either (i) unconnected to each other throughout their central regions, comprising 95% or more of the length of the spacer elements; or are (ii) connected to each other by transverse elements, where the average height of the transverse elements is less than that of the spacer elements, and is about 1 mm or less, and the average spacing between adjacent transverse elements is about 2.5 mm or more.

2. The module of claim 1, wherein said hollow fiber membrane sheets and spacer elements support a flow of liquid influent in a spiral flow pattern within the module.

3. The module of claim 1, wherein the parallel spacer elements are connected to each other by transverse elements.

4. The module of claim 3, wherein the transverse elements contact the hollow fiber membrane sheets.

5. The module of claim 3, wherein the transverse elements do not contact the hollow fiber membrane sheets.

6. The module of claim 1, wherein the parallel spacer elements are unconnected to each other throughout their central regions.

7. The module of claim 6, wherein the spacer elements are integral with the hollow fiber membrane sheets.

8. The module of claim 7, wherein the spacer elements are attached to the hollow fiber membrane sheets.

9. The module of claim 8, wherein the spacer elements are interwoven with the hollow fiber membrane sheets.

10. The module of claim 1, comprising a plurality of hollow fiber membrane sheets, which are wrapped around said core tube such that said hollow fiber membrane sheets at least partially overlap with one another.

11. The module of claim 10, wherein the plurality of hollow fiber membrane sheets is between 2 and about 200.

12. The module of claim 11, wherein the length of each hollow fiber membrane sheet is greater than the circumference of the core tube, such that said sheet is sufficiently long to wrap around the core tube at least once.

13. The module of claim 1, wherein the hollow fibers comprise a polymeric material selected from the group consisting of poly(ethylene terephthalate) (PET), poly(trimethylene terephthalate) (PTT), poly(butylene terephthalate) (PBT), poly(ethylene naphthalate) (PEN), poly(cyclohexylene dimethylene terephthalate) (PCTA), polycarbonate (PC), poly(butylene naphthalate) (PBN), poly(lactic acid) (PLA), a halogenated polyolefin, and a non-halogenated polyolefin.

14. The module of claim 13, wherein the non-halogenated polyolefin is polypropylene (PP) or polymethylpentene (PMP).

15. The module of claim 1, further comprising a gas sparging port, in communication with the interior of the core tube, and a drain port, effective to drain material from the lumens of the hollow fibers.

16. The module of claim 1, further comprising a retaining structure surrounding said one or more hollow fiber membrane sheets.

17. The module of claim 16, wherein the retaining structure is liquid permeable, such that the exterior surfaces of said hollow fibers are in fluid communication with a region external to the retaining structure.

18. A system comprising a plurality of modules according to claim 1 and a liquid-impermeable housing containing the modules,
   wherein said housing comprises a plurality of liquid influent ports, one in communication with the respective influent port of each said module, and at least one liquid effluent port effective to discharge treated liquid,
   and the hollow fibers of each module in the plurality are in fluid communication with the hollow fibers of every other module in the plurality.

19. The system of claim 18, further comprising at least one pump and conduits effective to introduce a liquid influent into the core tube of one or more of the plurality of modules, and to extract said liquid influent from the core tub of one or more of the plurality of modules, from within the retaining structures surrounding the hollow fiber membrane sheets, and/or from the region within the housing that is external to the retaining structures.

20. A method for treating a liquid in a membrane biofilm reactor, the method comprising:
   (a) providing a plurality of membrane biofilm reactor modules within a reactor housing, wherein said housing is liquid impermeable and comprises a plurality of liquid influent ports and at least one liquid effluent port; and wherein each module comprises:
      (i) a perforated core tube, having an interior which is in communication with at least one of said influent ports and with a source of sparging gas,
      (ii) a plurality of gas-permeable hollow fibers, each having an exterior surface, an interior surface that defines an inner lumen, a first open end, and a second open end which is in communication with a source of reagent gas,
      wherein the hollow fibers are interwoven with fibers to form one or more hollow-fiber membrane sheets, wrapped around said core tube to form adjacent facing layers, and
      (iii) a plurality of substantially parallel, rectangular spacer elements positioned between said adjacent facing layers of hollow fiber membrane sheets, effective to maintain open flow channels between said adjacent facing layers;
      wherein said parallel spacer elements are either unconnected to each other throughout their central regions comprising 95% or more of the length of the spacer elements, or are connected to each other by transverse elements, where the average height of the transverse elements is less than that of the spacer elements, and is about 1 mm or less, and the average spacing between adjacent transverse elements is about 2.5 mm or more;

(b) introducing said reagent gas into the inner lumens of the hollow fibers, and introducing a liquid influent into the core tube(s) of one or more of the plurality of modules, wherein said gas and/or liquid influent support the growth of a biomass on the external surfaces of the hollow fibers; and (c) collecting effluent liquid at said liquid effluent port of said housing.

21. The method of claim 20, further comprising (d) draining material from the lumens of the hollow fibers through a drain port, either periodically or continuously.

22. The method of claim 20, wherein the reagent gas is selected from hydrogen, methane, oxygen, carbon dioxide, carbon monoxide, nitrogen, and combinations thereof.

23. The method of claim 20, further comprising introducing a material into the liquid influent ports effective to control the pH of the liquid.

24. The method of claim 23, wherein said material is a mineral acid or carbon dioxide.

25. The method of claim 20, further comprising periodically introducing a sparge gas into the core tube of each module.

26. The method of claim 25, wherein the flow rate of influent fluid is increased during introduction of the sparge gas.

* * * * *